(12) United States Patent (10) Patent No.: US 12,494,016 B2
Bu et al. (45) Date of Patent: Dec. 9, 2025

(54) SYSTEMS AND METHODS FOR SUBJECT POSITIONING

(71) Applicant: SHANGHAI UNITED IMAGING HEALTHCARE CO., LTD., Shanghai (CN)

(72) Inventors: Yang Bu, Shanghai (CN); Fan Chen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 279 days.

(21) Appl. No.: 18/319,448

(22) Filed: May 17, 2023

(65) Prior Publication Data

US 2023/0290053 A1    Sep. 14, 2023

Related U.S. Application Data

(63) Continuation of application No. PCT/CN2021/131332, filed on Nov. 17, 2021.

(30) Foreign Application Priority Data

Nov. 17, 2020 (CN) .......................... 202011287547.6

(51) Int. Cl.
*G06T 17/00* (2006.01)
*G06T 15/00* (2011.01)

(52) U.S. Cl.
CPC .............. *G06T 17/00* (2013.01); *G06T 15/00* (2013.01); *G06T 2210/41* (2013.01); *G06T 2215/16* (2013.01)

(58) Field of Classification Search
CPC ..... G06T 17/00; G06T 15/00; G06T 2210/41; G06T 2215/16; A61B 5/0037;
(Continued)

(56) References Cited

U.S. PATENT DOCUMENTS 6,267,769 B1 * 7/2001 Truwit ................... A61B 90/11
606/1
7,869,562 B2 * 1/2011 Khamene ............... A61B 6/583
209/207
(Continued)

FOREIGN PATENT DOCUMENTS

CN        1583194 A     2/2005
CN      106898067 A     6/2017
(Continued)

OTHER PUBLICATIONS

International Search Report in PCT/CN2021/131332 mailed on Feb. 10, 2022, 5 pages.
(Continued)

*Primary Examiner* — Sheree N Brown
(74) *Attorney, Agent, or Firm* — METIS IP LLC

(57) ABSTRACT

The present disclosure is related to systems and methods for subject positioning. The method includes generating a reference subject model of a subject to be scanned by a medical device based on feature information of the subject and a scan protocol of the subject. The method includes generating a target subject model by performing one or more rendering operations on the reference subject model based on at least one rendering parameter associated with an image capturing device. The method includes generating a positioning result by integrating the target subject model with image data related to a scan scene of the subject captured by the image capturing device. The method includes positioning the subject based on the positioning result.

20 Claims, 11 Drawing Sheets

(58) Field of Classification Search
CPC ..... A61B 6/4417; A61B 5/0077; A61B 6/032; A61B 6/037; A61B 6/04; A61B 6/4405; A61B 6/4411; G01R 33/283; G01R 33/543
USPC .......................................................... 345/420
See application file for complete search history.

(56) References Cited

U.S. PATENT DOCUMENTS

| | | | |
|---|---|---|---|
| 9,436,993 | B1 | 9/2016 | Stolka et al. |
| 9,661,729 | B2* | 5/2017 | Arima .................... A61B 6/468 |
| 10,315,054 | B2* | 6/2019 | Mead ........................ G06T 7/85 |
| 10,789,498 | B2* | 9/2020 | Cao ..................... A61B 5/1077 |
| 2003/0133602 | A1* | 7/2003 | Bani-Hashemi ..... A61N 5/1049 382/131 |
| 2004/0081341 | A1* | 4/2004 | Cherek .................... A61B 6/08 382/128 |
| 2004/0258210 | A1* | 12/2004 | Ritter .................... A61B 6/4417 378/198 |
| 2006/0100510 | A1 | 5/2006 | Klausz |
| 2007/0038070 | A1* | 2/2007 | Tank .................... A61B 5/0037 600/410 |
| 2007/0172102 | A1* | 7/2007 | Hempel ............... A61B 5/1077 382/128 |
| 2009/0226066 | A1 | 9/2009 | Williams et al. |
| 2013/0279779 | A1* | 10/2013 | Darrow .................. A61B 5/055 382/131 |
| 2015/0297157 | A1* | 10/2015 | Mukumoto ............ A61B 6/465 378/15 |
| 2016/0074004 | A1* | 3/2016 | Braun ..................... G06F 3/017 378/205 |
| 2016/0232691 | A1* | 8/2016 | Nishii .................... G06T 11/008 |
| 2017/0112416 | A1* | 4/2017 | Hao ....................... A61B 6/032 |
| 2018/0214241 | A1* | 8/2018 | Furuta .................. A61B 90/361 |
| 2019/0205687 | A1* | 7/2019 | Cao ........................ A61B 6/469 |
| 2020/0178839 | A1* | 6/2020 | Krishnaiyer Raman ..................... A61B 6/0492 |
| 2020/0206536 | A1 | 7/2020 | Wang et al. |
| 2020/0218922 | A1* | 7/2020 | Chen .................... A61B 6/4417 |
| 2020/0229737 | A1* | 7/2020 | Hao ........................ A61B 6/04 |
| 2020/0268251 | A1* | 8/2020 | Hao ........................ A61B 5/1114 |
| 2020/0268339 | A1* | 8/2020 | Hao ........................ A61B 6/544 |

FOREIGN PATENT DOCUMENTS

| | | |
|---|---|---|
| CN | 107789001 A | 3/2018 |
| CN | 109464155 A | 3/2019 |
| CN | 109480882 A | 3/2019 |
| CN | 109584377 A | 4/2019 |
| CN | 109745066 A | 5/2019 |
| CN | 110037727 A | 7/2019 |
| CN | 110742631 A | 2/2020 |
| CN | 210044016 U | 2/2020 |
| CN | 111275825 A | 6/2020 |
| CN | 111631744 A | 9/2020 |
| CN | 111887878 A | 11/2020 |
| CN | 111915494 A | 11/2020 |
| CN | 112401919 A | 2/2021 |

OTHER PUBLICATIONS

Written Opinion in PCT/CN2021/131332 mailed on Feb. 10, 2022, 5 pages.
First Office Action in Chinese Application No. 202011287547.6 mailed on Jun. 6, 2022, 18 pages.

* cited by examiner 1010                    1020

SYSTEMS AND METHODS FOR SUBJECT POSITIONING

CROSS-REFERENCE TO RELATED APPLICATIONS

This application is a continuation of International Application No. PCT/CN2021/131332, filed on Nov. 17, 2021, which claims priority of Chinese Patent Application No. 202011287547.6, filed on Nov. 17, 2020, the contents of which are hereby incorporated by reference.

TECHNICAL FIELD

The present disclosure generally relates to a medical system, and more particularly, relates to systems and methods for subject positioning in the medical system.

BACKGROUND

Medical imaging techniques such as magnetic resonance imaging (MRI), positron emission tomography (PET), computed tomography (CT), and single-photon emission computed tomography (SPECT) are widely used in clinical diagnosis and/or treatment. When a medical device (e.g., an X-ray imaging device) is used to perform a scan, a subject (e.g., a patient) needs to be positioned, holding a specific posture so that a target portion of the subject can be imaged and/or treated effectively. Usually, a user (e.g., a doctor, a nurse, a technician) needs to instruct the subject personally so that the subject can carry out and maintain the posture. The subject positioning process is generally complicated, time consuming, and/or has low accuracy, sometimes even impairing the efficiency of an imaging and/or treatment process. Therefore, it is desirable to provide systems and methods for facilitating the subject positioning of a subject in an imaging and/or treatment process.

SUMMARY

According to an aspect of the present disclosure, a method may be implemented on a computing device having one or more processors and one or more storage devices. The method may include generating a reference subject model of a subject to be scanned by a medical device based on feature information of the subject and a scan protocol of the subject. The method may include generating a target subject model by performing one or more rendering operations on the reference subject model based on at least one rendering parameter associated with an image capturing device. The method may include generating a positioning result by integrating the target subject model with image data related to a scan scene of the subject captured by the image capturing device. The method may include positioning the subject based on the positioning result.

In some embodiments, the method may include generating a subject model of the subject based on the feature information of the subject. The method may include generating the reference subject model of the subject by transforming the subject model based on the scan protocol of the subject.

In some embodiments, the method may include obtaining a reference posture model based on the scan protocol of the subject. The method may include generating the reference subject model of the subject by transforming the reference posture model based on the feature information of the subject.

In some embodiments, the at least one rendering parameter may include an intrinsic parameter of the image capturing device or an extrinsic parameter of the image capturing device.

In some embodiments, the method may include obtaining image data of the subject captured by the image capturing device. The method may include generating composite image data illustrating the target subject model and the subject based on the target subject model and the image data. In the composite image data, a representation of the target subject model may be superimposed on a representation of the subject.

In some embodiments, the method may include causing a terminal device to display the composite image data illustrating the target subject model and the subject.

In some embodiments, the method may include obtaining a plurality of first coordinates of a plurality of marker points in a first coordinate system associated with the medical device. The method may include obtaining at least one image of the plurality of marker points capture by the image capturing device. The method may include determining a plurality of second coordinates of the plurality of marker points in a second coordinate system associated with the image capturing device based on the at least one image of the plurality of marker points. The method may include determining a mapping relationship between the first coordinate system and the second coordinate system based on the plurality of first coordinates of the plurality of marker points and the plurality of second coordinates of the plurality of marker points.

In some embodiments, the method may include obtaining target image data of the subject holding a current posture captured by the image capturing device. The method may include generating a current subject model based on the target image data of the subject. The method may include determining whether the current posture of the subject needs to be adjusted based on the current subject model and the target subject model. The method may include, in response to determining that the current posture of the target subject needs to be adjusted, guiding the subject to move one or more body parts of the subject.

In some embodiments, the method may include obtaining at least one candidate coordinate of at least one first feature point in the current subject model in the second coordinate system. The method may include obtaining at least one actual coordinate of the at least one first feature point in the first coordinate system based on the mapping relationship between the first coordinate system and the second coordinate system. The method may include obtaining at least one actual coordinate of at least one second feature point in the target subject model in the first coordinate system. The at least one first feature point and the at least one second feature point may correspond to a same portion of the subject. The method may include determining whether the starting posture of the subject needs to be adjusted based on the at least one actual coordinate of the at least one first feature point and the at least one actual coordinate of the at least one second feature point.

In some embodiments, the method may include determining a deviation between the at least one actual coordinate of the at least one first feature point and the at least one actual coordinate of the at least one second feature point. The method may include determining whether the starting posture of the subject needs to be adjusted based on the deviation.

In some embodiments, the at least one first feature point or the at least one second feature point may correspond to an anatomical joint of the subject.

According to an aspect of the present disclosure, a system may include at least one storage device storing a set of instructions, and at least one processor in communication with the at least one storage device. When executing the stored set of instructions, the at least one processor may cause the system to perform a method. The method may include generating a reference subject model of a subject to be scanned by a medical device based on feature information of the subject and a scan protocol of the subject. The method may include generating a target subject model by performing one or more rendering operations on the reference subject model based on at least one rendering parameter associated with an image capturing device. The method may include generating a positioning result by integrating the target subject model with image data related to a scan scene of the subject captured by the image capturing device. The method may include positioning the subject based on the positioning result.

According to an aspect of the present disclosure, a system may include at least one storage device storing a set of instructions, and at least one processor in communication with the at least one storage device. When executing the stored set of instructions, the at least one processor may cause the system to perform a method. The method may include generating a reference subject model of a subject to be scanned by a medical device based on feature information of the subject and a scan protocol of the subject. The method may include generating a target subject model by performing one or more rendering operations on the reference subject model based on at least one rendering parameter associated with an image capturing device. The method may include generating a positioning result by integrating the target subject model with image data related to a scan scene of the subject captured by the image capturing device. The method may include positioning the subject based on the positioning result.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
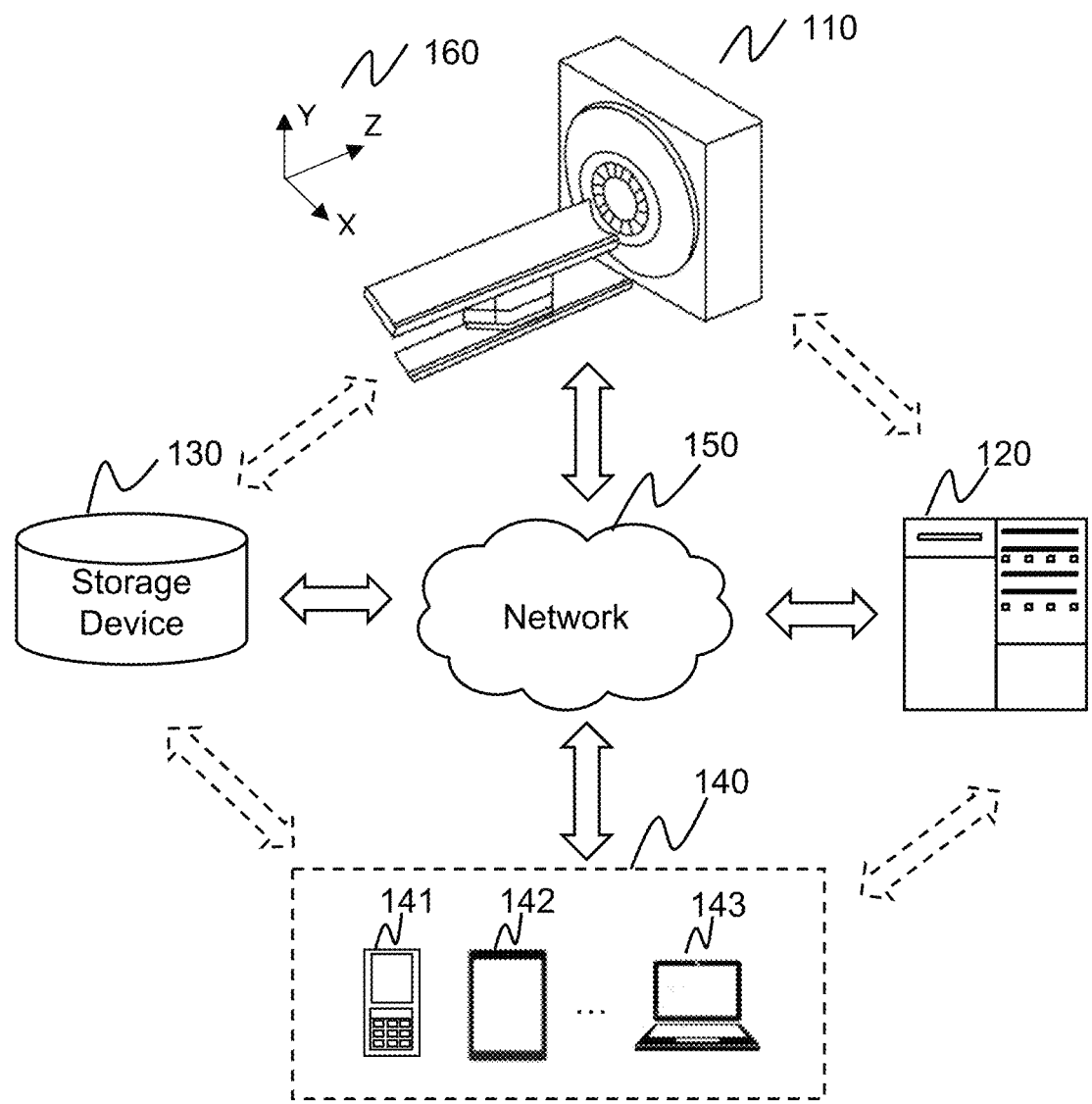
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block," as used herein, refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., the processor 210 illustrated in FIG. 2 and/or the central processing unit (CPU) 340 illustrated FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Provided herein are medical systems and methods for non-invasive biomedical imaging/treatment, such as for disease diagnostic, disease therapy, or research purposes. In some embodiments, the medical system may include a single modality system and/or a multi-modality system. The term "modality" used herein broadly refers to an imaging or treatment method or technology that gathers, generates, processes, and/or analyzes imaging information of a subject or treatments the subject. The single modality system may include, for example, an ultrasound imaging system, an X-ray imaging system (e.g., a digital radiography (DR) system, a computed radiography (CR) system), a computed tomography (CT) system, a magnetic resonance imaging (MRI) system, an ultrasonography system, a single photon emission computed tomography (SPECT), a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, a digital subtraction angiography (DSA) system, or the like, or any combination thereof. The multi-modality system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a positron emission tomography-magnetic resonance imaging (PET-MR) system, a digital subtraction angiography-magnetic resonance imaging (DSA-MRI) system, etc. In some embodiments, the medical system may include a treatment system. The treatment system may include a treatment plan system (TPS), an image-guided radiotherapy (IGRT) system, etc. The image-guided radiotherapy (IGRT) may include a treatment device and an imaging device. The treatment device may include a linear accelerator, a cyclotron, a synchrotron, etc., configured to perform radiotherapy on a subject. The treatment device may include an accelerator of species of particles including, for example, photons, electrons, protons, or heavy ions. The imaging device may include an MRI scanner, a CT scanner, etc. It should be noted that the medical system described below is merely provided for illustration purposes, and not intended to limit the scope of the present disclosure.

In the present disclosure, the term "image" may refer to a two-dimensional (2D) image, a three-dimensional (3D) image, or a four-dimensional (4D) image. In some embodiments, the term "image" may refer to an image of a region (e.g., a region of interest (ROI)) of a subject. As described above, the image may be a CT image, a PET image, an MR image, a fluoroscopy image, an ultrasound image, an Electronic Portal Imaging Device (EPID) image, etc.

As used herein, a representation of an object (e.g., a patient, a subject, or a portion thereof) in an image may be referred to as an "object" for brevity. For instance, a representation of an organ or tissue (e.g., a heart, a liver, a lung) in an image may be referred to as an organ or tissue for brevity. Further, an image including a representation of an object may be referred to as an image of an object or an image including an object for brevity. Still further, an operation performed on a representation of an object in an image may be referred to as an operation performed on an object for brevity. For instance, a segmentation of a portion of an image including a representation of an organ or tissue from the image may be referred to as a segmentation of an organ or tissue for brevity.

An aspect of the present disclosure relates to systems and methods for subject positioning. A processing device may generate a reference subject model of a subject to be scanned by a medical device based on feature information of the subject and a scan protocol of the subject. The processing device may generate a target subject model by performing one or more rendering operations on the reference subject model based on at least one rendering parameter associated with an image capturing device. The processing device may generate a positioning result by integrating the target subject model with image data related to a scan scene of the subject captured by the image capturing device. The processing device may position the subject based on the positioning result.

Accordingly, the posture of the subject may be adjusted based on the positioning result. For example, real-time composite image data (e.g., a real-time video) illustrating the target subject model and the subject may be displayed to the subject (e.g., a patient) and/or a user (e.g., a doctor, a nurse, a technician) of the medical device, and the subject may adjust his or her posture according to the real-time composite image data. After the posture of the subject is adjusted, the medical device may perform a medical procedure on the subject, e.g., generate image data by imaging the subject or a portion thereof. Therefore, the user's instruction time may be reduced, the subject positioning process may be simplified, and accordingly the efficiency of the subject positioning process may be improved.

FIG. 1 is a schematic diagram illustrating an exemplary medical system according to some embodiments of the present disclosure. As illustrated in FIG. 1, the medical system 100 may include a medical device 110, a processing device 120, a storage device 130, a terminal device 140, and a network 150. In some embodiments, two or more components of the medical system 100 may be connected to and/or communicate with each other via a wireless connection, a wired connection, or a combination thereof. The medical system 100 may include various types of connection between its components. For example, the medical device 110 may be connected to the processing device 120 through the network 150, or connected to the processing device 120 directly as illustrated by the bidirectional dotted arrow connecting the medical device 110 and the processing device 120 in FIG. 1. As another example, the terminal device 140 may be connected to the processing device 120 through the network 150, or connected to the processing device 120 directly as illustrated by the bidirectional dotted arrow connecting the terminal device 140 and the processing device 120 in FIG. 1. As still another example, the storage device 130 may be connected to the medical device 110 through the network 150, or connected to the medical device 110 directly as illustrated by the bidirectional dotted arrow connecting the medical device 110 and the storage device 130 in FIG. 1. As still another example, the storage device 130 may be connected to the terminal device 140 through the network 150, or connected to the terminal device 140 directly as illustrated by the bidirectional dotted arrow connecting the terminal device 140 and the storage device 130 in FIG. 1.

The medical device 110 may be configured to acquire image data relating to a subject. The image data relating to a subject may include an image (e.g., an image slice), projection data, or a combination thereof. In some embodiments, the image data may be two-dimensional (2D) image data, three-dimensional (3D) image data, four-dimensional (4D) image data, or the like, or any combination thereof. The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof. In the present disclosure, "object" and "subject" are used interchangeably.

In some embodiments, the medical device 110 may include a single modality imaging device. For example, the medical device 110 may include a positron emission tomography (PET) device, a single-photon emission computed tomography (SPECT) device, a magnetic resonance imaging (MRI) device (also referred to as an MR device, an MR scanner), a computed tomography (CT) device (e.g., a spiral CT, an electron beam CT, an energy spectrum CT), an ultrasound (US) device, an X-ray imaging device, a digital subtraction angiography (DSA) device, a magnetic resonance angiography (MRA) device, a computed tomography angiography (CTA) device, or the like, or any combination thereof. In some embodiments, the medical device 110 may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

In some embodiments, the medical device 110 may transmit the image data via the network 150 to the processing device 120, the storage device 130, and/or the terminal device 140. For example, the image data may be sent to the processing device 120 for further processing or may be stored in the storage device 130.

The processing device 120 may process data and/or information. The data and/or information may be obtained from the medical device 110 or retrieved from the storage device 130, the terminal device 140, and/or an external device (external to the medical system 100) via the network 150. For example, the processing device 120 may generate a reference subject model of a subject to be scanned by a medical device (e.g., the medical device 110) based on feature information of the subject and a scan protocol of the subject. As another example, the processing device 120 may generate a target subject model by performing one or more rendering operations on a reference subject model based on at least one rendering parameter associated with an image capturing device. As still another example, the processing device 120 may generate a positioning result by integrating a target subject model with image data related to a scan scene of a subject captured by an image capturing device. As still another example, the processing device 120 may position the subject based on a positioning result. In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal device 140 via the network 150. As another example, the processing device 120 may be directly connected to the medical device 110, the terminal device 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or any combination thereof. In some embodiments, the processing device 120 may be part of the terminal device 140. In some embodiments, the processing device 120 may be part of the medical device 110.

The storage device 130 may store data, instructions, and/or any other information. In some embodiments, the storage device 130 may store data obtained from the medical device 110, the processing device 120, and/or the terminal device 140. The data may include image data acquired by the processing device 120, algorithms and/or models for processing the image data, etc. For example, the storage device 130 may store image data of a subject obtained from a medical device (e.g., the medical device 110). As another example, the storage device 130 may store a reference subject model generated by the processing device 120. As still another example, the storage device 130 may store a target subject model generated by the processing device 120. As still another example, the storage device 130 may store a positioning result determined by the processing device 120. In some embodiments, the storage device 130 may store data and/or instructions that the processing device 120, and/or the terminal device 140 may execute or use to perform exemplary methods described in the present disclosure. In some embodiments, the storage device 130 may include a mass storage, a removable storage, a volatile read-and-write memory, a read-only memory (ROM), or the like, or any combination thereof. Exemplary mass storages may include a magnetic disk, an optical disk, a solid-state drive, etc. Exemplary removable storages may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal device 140). One or more components in the medical system 100 may access the data or instructions stored in the storage device 130 via the network 150. In some embodiments, the storage device 130 may be integrated into the medical device 110 or the terminal device 140.

The terminal device 140 may be connected to and/or communicate with the medical device 110, the processing device 120, and/or the storage device 130. In some embodiments, the terminal device 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal device 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the medical system 100. In some embodiments, one or more components of the medical system 100 (e.g., the medical device 110, the processing device 120, the storage device 130, the terminal device 140, etc.) may communicate information and/or data with one or more other components of the medical system 100 via the network 150. For example, the processing device 120 and/or the terminal device 140 may obtain image data from the medical device 110 via the network 150. As another example, the processing device 120 and/or the terminal device 140 may obtain information stored in the storage device 130 via the network 150. The network 150 may be and/or include a public network (e.g., the Internet), a private network (e.g., a local area network (LAN), a wide area network (WAN), etc.), a wired network (e.g., an Ethernet network), a wireless network (e.g., a Wi-Fi network), a cellular network (e.g., a long term evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

In some embodiments, a medical coordinate system (also referred to as a first coordinate system associated with a medical device) may be provided for the medical system 100 to define a position of a component (e.g., an absolute position, a position relative to another component) and/or a movement of the component. For illustration purposes, the medical coordinate system 160 may include the X-axis, the Y-axis, and the Z-axis. The X-axis and the Z-axis shown in FIG. 1 may be horizontal, and the Y-axis may be vertical. As illustrated, a positive X direction along the X-axis may be from the left side to the right side of a scanning table viewed from the direction facing the front of the medical device 110; a positive Y direction along the Y-axis may be from the lower part (or from the floor where the medical device 110 stands) to the upper part of a gantry of the medical device 110; and a positive Z direction along the Z-axis may be the direction in which the scanning table is moved from the outside into the medical device 110 viewed from the direction facing the front of the medical device 110.

It should be noted that the provided medical coordinate system 160 is illustrative, and not intended to limit the scope of the present disclosure. For example, the medical coordinate system 160 may only include two axes (e.g., the X-axis and the Y-axis). In addition, although the following descriptions discuss through various examples to determine a position of an entity by determining a coordinate of an entity in a certain coordinate system, it should be understood that the position of the entity may be determined by determining a coordinate of the entity in another coordinate system (e.g., a coordinate system that has a known transformation relationship with the certain medical coordinate system). For the convenience of descriptions, coordinates of an entity along an X-axis, a Y-axis, and a Z-axis in a coordinate system are also referred to as an X-coordinate, a Y-coordinate, and a Z-coordinate of the entity in the coordinate system, respectively.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the medical system 100 may include one or more additional components and/or one or more components of the medical system 100 described above may be omitted. Additionally or alternatively, two or more components of the medical system 100 may be integrated into a single component. A component of the medical system 100 may be implemented on two or more sub-components.

In some embodiments, the medical system 100 may include an image capturing device. The image capturing device may be configured to capture image data of a subject before, during, and/or after the medical device 110 performs a scan on the subject. For example, before the scan, the image capturing device may capture image data of the subject, which may be used to generate a reference subject model. As another example, after the subject is positioned at a scan position (i.e., a specific position for receiving the scan), the image capturing device may be configured to capture image data of the subject, which may be used to check whether a current posture and/or position of the subject needs to be adjusted.

The image capturing device may be and/or include any suitable device that is capable of capturing image data of the subject. For example, the image capturing device may include a camera (e.g., a digital camera, an analog camera, etc.), a red-green-blue (RGB) sensor, an RGB-depth (RGB-D) sensor, or another device that can capture color image data of the subject. As another example, the image capturing device may be used to acquire point-cloud data of the subject. The point-cloud data may include a plurality of data points, each of which may represent a physical point on a body surface of the subject and can be described using one or more feature values of the physical point (e.g., feature values relating to the position and/or the composition of the physical point). Exemplary image capturing devices capable of acquiring point-cloud data may include a 3D scanner, such as a 3D laser imaging device, a structured light scanner (e.g., a structured light laser scanner). As still another example, the image capturing device may be used to acquire depth image data of the subject. The depth image data may refer to image data that includes depth information of each physical point on the body surface of the subject, such as a distance from each physical point to a specific point (e.g., an optical center of the image capturing device). The depth image data may be captured by a range sensing device, e.g., a structured light scanner, a time-of-flight (TOF) device, a stereo triangulation camera, a sheet of light triangulation device, an interferometry device, a coded aperture device, a stereo matching device, or the like, or any combination thereof.

In some embodiments, the image capturing device may be a device independent from the medical device 110. For example, the image capturing device may be a camera mounted on the ceiling in an examination room where the medical device 110 is located or out of the examination room. As another example, the image capturing device may be mounted above a scanning table of the medical device 110. As another example, the image capturing device may be mounted on the side of the scanning table of the medical device 110. As another example, the image capturing device may be mounted in front of the scanning table of the medical device 110. In some embodiments, the image capturing device may be integrated into or mounted on the medical device 110 (e.g., a gantry of the medical device 110). In some embodiments, the image data acquired by the image capturing device may be transmitted to the processing device 120 for further analysis. Additionally or alternatively, the image data acquired by the image capturing device may be transmitted to a terminal device (e.g., the terminal device 140) for display and/or a storage device (e.g., the storage device 130) for storage.

In some embodiments, the image capturing device may be configured to capture image data of the subject continuously or intermittently (e.g., periodically) before, during, and/or after a scan of the subject performed by the medical device 110. In some embodiments, the acquisition of the image data by the image capturing device, the transmission of the captured image data to the processing device 120, and the analysis of the image data may be performed substantially in real time so that the image data may provide information indicating a substantially real time status (e.g., a substantially real time posture, a substantially real time position) of the subject.

Figure 2:
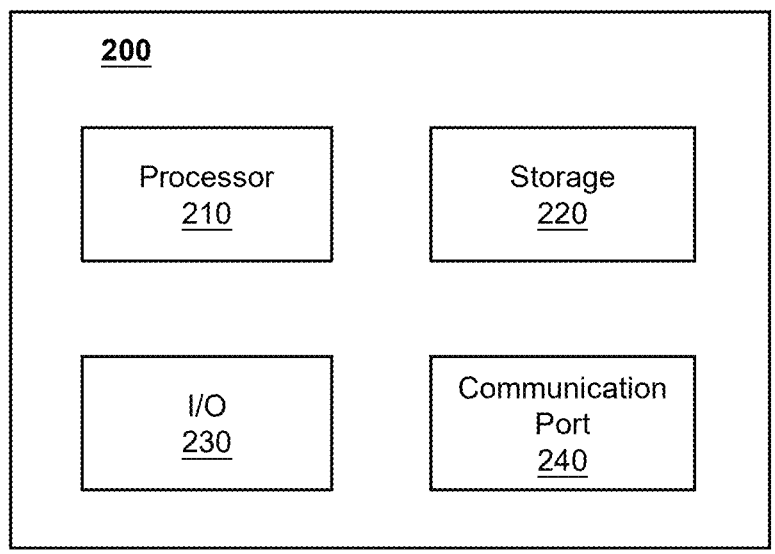
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal device 140, the storage device 130, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the medical device 110, the terminal device 140, the storage device 130, and/or any other component of the medical system 100. The storage 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal device 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
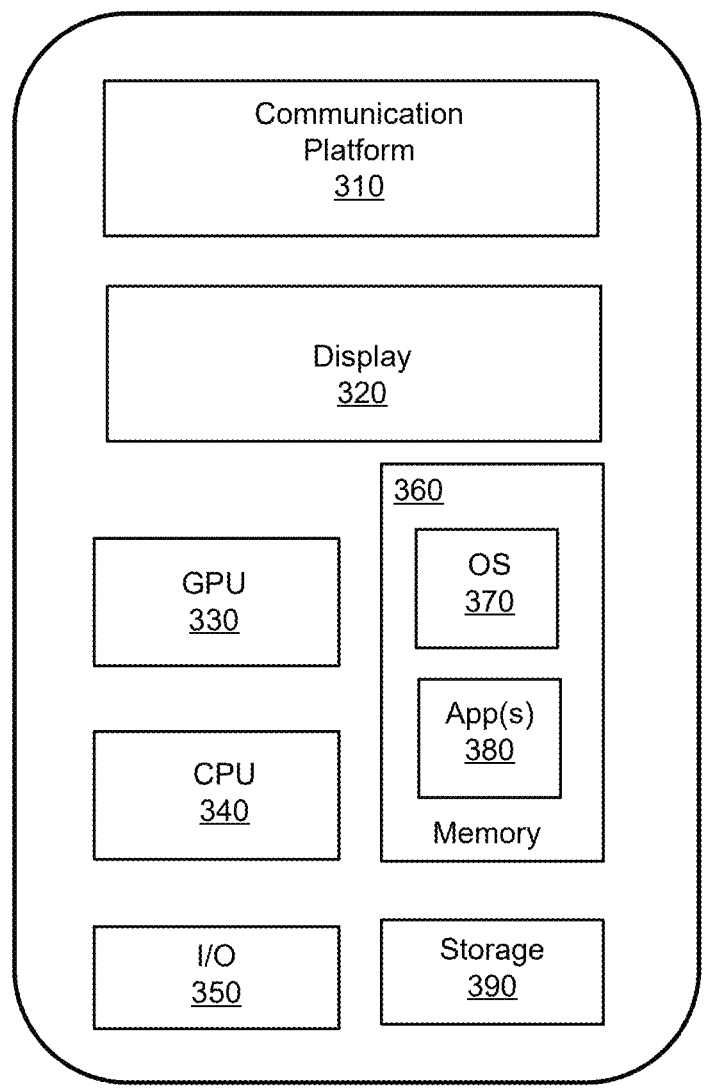
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal device 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include image data acquired by the medical device 110.

In some embodiments, a mobile operating system (OS) 370 (e.g., iOS™, Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
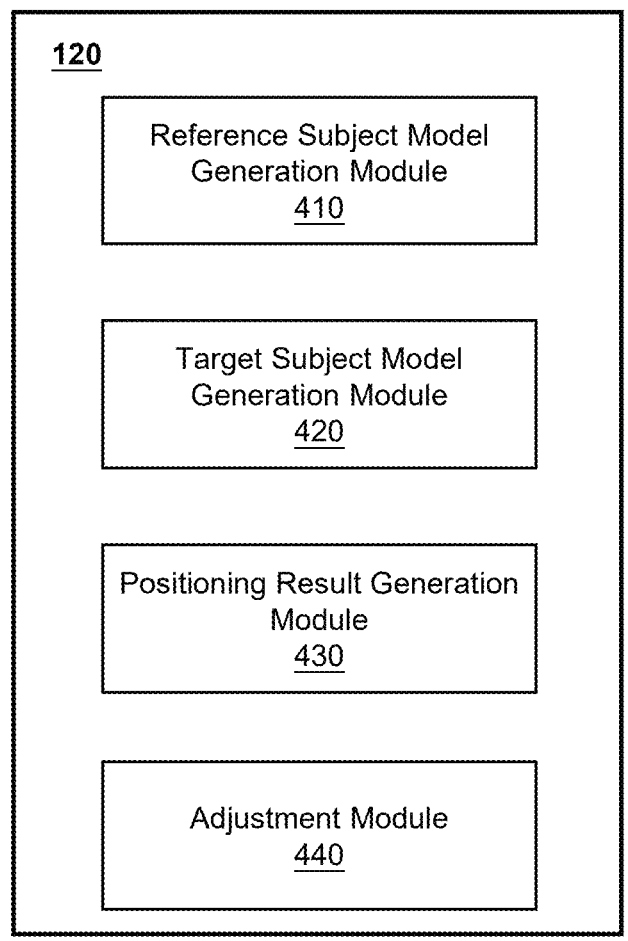
FIG. 4 is a block diagram illustrating an exemplary processing device according to some embodiments of the present disclosure.

FIG. 4 is a block diagram illustrating an exemplary processing device according to some embodiments of the present disclosure. In some embodiments, the processing device 120 may include a reference subject model generation module 410, a target subject model generation module 420, a posturing result generation module 430, and an adjustment module 440.

The reference subject model generation module 410 may be configured to generate a reference subject model. In some embodiments, the reference subject model generation module 410 may generate a reference subject model of a subject based on feature information of the subject and a scan protocol of the subject. For example, the reference subject model generation module 410 may generate a reference subject model of a subject based on feature information of the subject and a scan protocol of the subject according to one or more mesh generation techniques. As another example, the reference subject model generation module 410 may generate a subject model of a subject based on feature information of the subject. The reference subject model generation module 410 may generate a reference subject model of the subject by transforming the subject model based on a scan protocol of the subject. As still another example, the reference subject model generation module 410 may obtain a reference posture model based on a scan protocol of a subject. The reference subject model generation module 410 may generate a reference subject model of the subject by transforming the reference posture model based on feature information of the subject. More descriptions for generating the reference subject model may be found elsewhere in the present disclosure (e.g., operation 510 in FIG. 5, and descriptions thereof).

The target subject model generation module 420 may be configured to generate a target subject model. In some embodiments, the target subject model generation module 420 may generate a target subject model by performing one or more rendering operations on a reference subject model based on at least one rendering parameter associated with an image capturing device. For example, the target subject model generation module 420 may adjust a display effect (e.g., a display angle, a display position, a display size) of a reference subject model on a display of a terminal device (e.g., the terminal device 130) based on intrinsic parameters of an image capturing device and/or extrinsic parameters of the image capturing device, to generate a target subject model. More descriptions for generating the target subject model may be found elsewhere in the present disclosure (e.g., operation 520 in FIG. 5, and descriptions thereof).

The positioning result generation module 430 may be configured to generate a positioning result. In some embodiments, the positioning result generation module 430 may generate a positioning result by integrating a target subject model with image data related to a scan scene of a subject captured by an image capturing device. For example, the positioning result generation module 430 may obtain image data of a subject captured by an image capturing device. The positioning result generation module 430 may generate composite image data illustrating a target subject model and the subject based on the target subject model and the image data. More descriptions for generating the positioning result may be found elsewhere in the present disclosure (e.g., operation 530 in FIG. 5, and descriptions thereof).

The adjustment module 440 may be configured to adjust a posture of a subject based on the positioning result. In some embodiments, the adjustment module 440 may obtain target image data of a subject holding a current posture captured by an image capturing device. The adjustment module 440 may generate a current subject model based on the target image data of the subject. The adjustment module 440 may determine whether the current posture of the subject needs to be adjusted based on the current subject model and a target subject model. For example, the adjustment module 440 may obtain at least one candidate coordinate of at least one first feature point in a current subject model in a second coordinate system associated with an image capturing device. The adjustment module 440 may obtain at least one actual coordinate of the at least one first feature point in a first coordinate system associated with a medical device based on a mapping relationship between the first coordinate system and the second coordinate system. The adjustment module 440 may obtain at least one actual coordinate of at least one second feature point in a target subject model in the first coordinate system. The adjustment module 440 may determine whether a current posture of the subject needs to be adjusted based on the at least one actual coordinate of the at least one first feature point and the at least one actual coordinate of the at least one second feature point. More descriptions for adjusting a posture of a subject based on a positioning result may be found elsewhere in the present disclosure (e.g., operation 540 in FIG. 5, FIG. 6, FIG. 7, and descriptions thereof).

In some embodiments, the adjustment module 440 may obtain a plurality of first coordinates of a plurality of marker points in a first coordinate system associated with a medical device. The adjustment module 440 may obtain at least one image of the plurality of marker points capture by an image capturing device. The adjustment module 440 may determine a plurality of second coordinates of the plurality of marker points in a second coordinate system associated with the image capturing device based on the at least one image of the plurality of marker points. The adjustment module 440 may determine a mapping relationship between the first coordinate system and the second coordinate system based on the plurality of first coordinates of the plurality of marker points and the plurality of second coordinates of the plurality of marker points. More descriptions for determining a mapping relationship between a first coordinate system and a second coordinate system may be found elsewhere in the present disclosure (e.g., FIG. 8, and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the reference subject model generation module 410 and the target subject model generation module 420 may be combined into a single module. In some embodiments, one or more modules may be added or omitted in the processing device 120. For example, the processing device 120 may further include a storage module (not shown in FIG. 4) configured to store data and/or information (e.g., a reference subject model, a target subject model, a positioning result) associated with the medical system 100.

Figure 5:
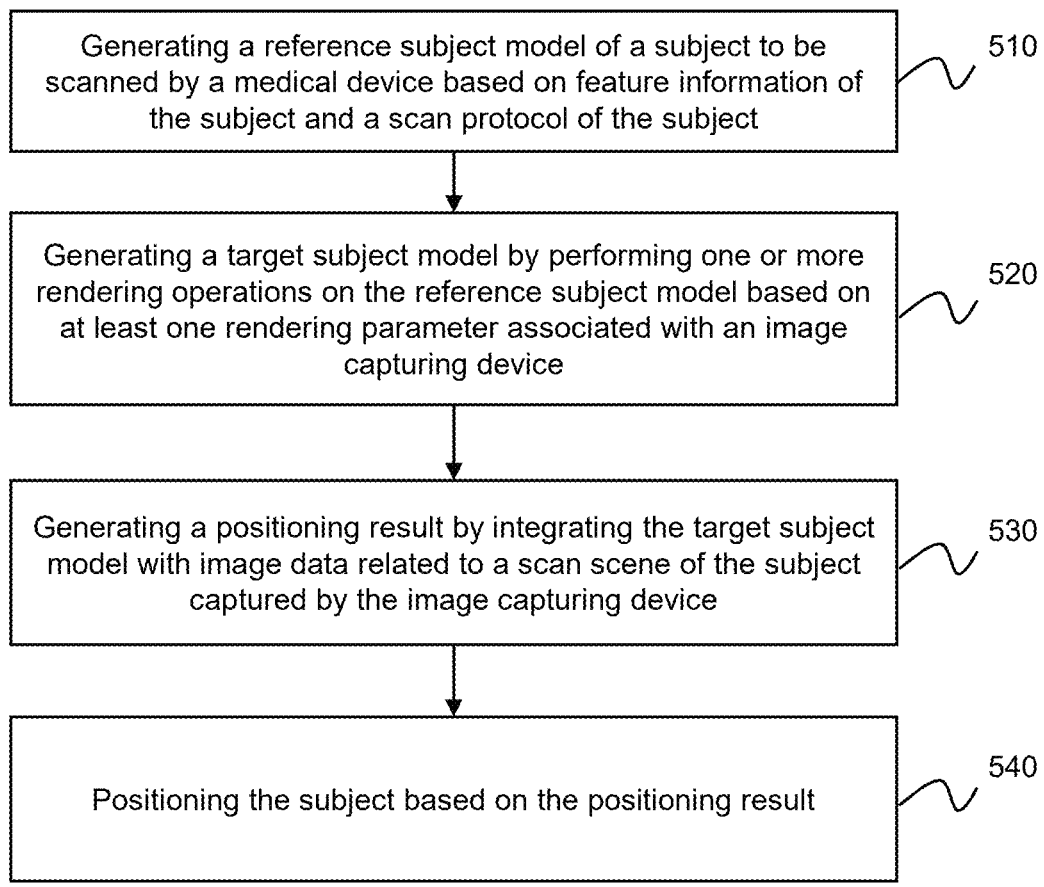
FIG. 5 is a flowchart illustrating an exemplary process for subject positioning according to some embodiments of the present disclosure.

FIG. 5 is a flowchart illustrating an exemplary process for subject positioning according to some embodiments of the present disclosure. In some embodiments, process 500 may be executed by the medical system 100. For example, the process 500 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the reference subject model generation module 410) may generate a reference subject model of a subject to be scanned by a medical device based on feature information of the subject and a scan protocol of the subject.

As used herein, a reference subject model refers to a model representing a subject to be scanned when holding a reference posture. The reference posture may be a standard posture that the subject needs to hold during a scan to be performed on the subject. Exemplary reference postures may include a head first-supine (HFS) posture, a head first-prone (HFP) posture, a head first-decubitus right (HFDR) posture, a head first-decubitus left (HFDL) posture, a feet first-decubitus right (FFDR) posture, a feet first-decubitus left (FFDL) posture, a feet first-prone (FFP) posture, a feet first-supine (FFS) posture, or the like.

In some embodiments, the reference subject model may include a 2D skeleton model, a 3D skeleton model, a 3D mesh model, or the like, of the subject. A 2D skeleton model of a subject may include an image illustrating one or more anatomical joints and/or bones of the subject in 2D space. A 3D skeleton model of a subject may include an image illustrating one or more anatomical joints and/or bones of the subject in 3D space. A 3D mesh model of a subject may include a plurality of vertices, edges, and faces that define a 3D shape of the subject.

The feature information of the subject may include the gender of the subject, the age of the subject, a shape (e.g., a width, a thickness, a height, a weight) of the subject or a portion thereof, a position of a specific physical point (e.g., an anatomical joint) of the subject, or the like, or any combination thereof. The anatomical joint may include a shoulder joint, a knee joint, an elbow joint, an ankle joint, a wrist joint, or the like, of the subject. As used herein, a width of a subject refers to a length of the subject (e.g., a length at the center of the subject, a maximum length of the subject) along a direction perpendicular to a sagittal plane of the subject. A height of a subject refers to a length of the subject (e.g., a length at the center of the subject, a maximum length of the subject) along a direction perpendicular to a transverse plane of the subject. A thickness of a subject refers to a length of the subject (e.g., a length at the center of the subject, a maximum length of the subject) along a direction perpendicular to a coronal plane of the subject.

In some embodiments, the feature information of the subject may be previously determined and stored in a storage device (e.g., the storage device 130, the storage device 220, the storage 390, or an external source). The processing device 120 may retrieve the feature information of the subject from the storage device. Additionally or alternatively, the feature information of the subject may be determined based on image data of the subject. For example, an image capturing device may capture the image data of the subject, and the processing device 120 may determine the feature information (or a portion thereof) of the subject based on the image data according to an image analysis algorithm (e.g., an image segmentation algorithm, a feature point extraction algorithm).

In some embodiments, the scan protocol may include a portion of the subject to be scanned, a modality of a medical device, value(s) or value range(s) of one or more scanning parameters (e.g., an X-ray tube voltage and/or current, an X-ray tube angle, a scan mode, a table moving speed, a gantry rotation speed, a field of view (FOV)), a source image distance (SID), or the like, or any combination thereof. The scan protocol (or a portion thereof) may be determined manually by a user (e.g., a doctor, a nurse, a technician) or by one or more components (e.g., the processing device 120) of the medical system 100 according to different situations. In some embodiments, the reference posture that the subject needs to hold during the scan to be performed on the subject may be determined based on the scan protocol of the subject. Merely by way of example, if the chest of the subject needs to be imaged by an X-ray imaging device, the reference posture may be that the subject stands on the floor and places his/her hands on the waist. As another example, if the calf of the subject needs to be imaged by an X-ray imaging device, the reference posture may be that the subject stands on the floor and bends his/her knees. As still another example, if the vertebral of the subject needs to be imaged by a CT device, the reference posture may be that the subject lies on a scanning table with legs and arms splaying on a scanning table.

In some embodiments, the processing device 120 may generate the reference subject model of the subject based on the feature information of the subject and the scan protocol of the subject according to the one or more mesh generation techniques, such as a Triangular/Tetrahedral (Tri/Tet) technique (e.g., an Octree algorithm, an advancing front algorithm, a Delaunay algorithm, etc.), a Quadrilateral/Hexahedra (Quad/Hex) technique (e.g., a Trans-finite Interpolation (TFI) algorithm, an Elliptic algorithm, etc.), a hybrid technique, a parametric model based technique, a surface meshing technique, or the like, or any combination thereof. For example, the processing device 120 may generate the reference subject model of the subject based on the feature information of the subject and the reference posture of the subject.

In some embodiments, the processing device 120 may generate a subject model of the subject based on the feature information of the subject. As used herein, a subject model refers to a model representing feature information of a subject. In some embodiments, the subject model may include a 2D skeleton model, a 3D skeleton model, a 3D mesh model, or the like, of the subject. In some embodiment, the processing device 120 may generate the subject model (e.g., a 3D mesh model) of the subject based on the feature information of the subject and/or the image data of the subject according to the one or more mesh generation techniques. Further, the processing device 120 may generate the reference subject model of the subject by transforming the subject model based on the scan protocol of the subject. In some embodiments, the processing device 120 may generate the reference subject model of the subject by transforming the subject model based on the reference posture of the subject. In some embodiments, the processing device 120 may perform one or more image processing operations (e.g., rotation, translation, distortion) on one or more portions of the subject model based on the reference posture, to generate the reference subject model. For example, the processing device 120 may rotate a portion of the subject model representing the right elbow of the subject so that the joint angle of the right elbow of the subject in the transformed subject model is equal to or substantially equal to the joint angle of the right elbow of the reference posture. As another example, the processing device 120 may translate a first portion representing the left ankle of the subject and/or a second portion representing the right ankle of the subject so that the distance between the first and second portions in the transformed subject model is equal to or substantially equal to the distance between the left ankle and the right ankle of the reference posture.

In some embodiments, the processing device 120 may obtain a reference posture model based on the scan protocol of the subject. As used herein, a reference posture model refers to a model representing a reference subject holding a reference posture. The reference subject may be a real human or a phantom. The reference posture model may include a 2D skeleton model, a 3D skeleton model, a 3D mesh model, or the like, of the reference subject. In some embodiments, a posture model library having a plurality of posture models may be previously generated and stored in a storage device (e.g., the storage device 130, the storage device 220, and/or the storage 390, an external source). In some embodiments, the plurality of posture models may include posture models corresponding to different examination regions of human. For example, for each examination region (e.g., the chest, the vertebral, the elbow), a set of posture models may be available, wherein each posture model in the set of posture models may represent a reference subject who has a particular feature (e.g., having a particular gender, and/or a particular body shape) and hold a reference posture corresponding to the examination region. Merely by way of example, for the chest of human, the corresponding set of posture models may include posture models representing a plurality of reference subjects who hold a standard posture for the chest examination and have different body shapes (e.g., heights and/or weights). The processing device 120 may further select the reference posture model from the posture model library based on the scan protocol of the subject (e.g., the portion of the subject to be scanned) and the feature information of the subject. For example, the processing device 120 may acquire a set of posture models corresponding to the scan protocol of the subject (e.g., the portion of the subject to be scanned), and select one from the set of posture models as the reference posture model. The selected posture model may represent a reference subject having same feature information as or similar feature information to the subject. Merely by way of example, if the portion of the subject to be scanned is the chest and the subject is a female, the processing device 120 may obtain a set of posture models corresponding to the chest examination, and select a posture model that represents a female reference subject as the reference posture model of the subject. By generating the posture models in advance, the generation process of the reference posture model may be simplified, which in turn, may improve the efficiency of the generation of the reference subject model.

Further, the processing device 120 may generate the reference subject model of the subject by transforming the reference posture model based on the feature information of the subject. In some embodiments, the processing device 120 may perform one or more image processing operations (e.g., rotation, translation, distortion) on one or more portions of the reference posture model based on the feature information of the subject, to generate the reference subject model. For example, the processing device 120 may stretch or shrink the reference posture model so that the height, the width, and/or the thickness of the transformed reference posture model is equal to or substantially equal to the height, the width, and/or the thickness of the subject.

According to some embodiments of the present disclosure, the reference subject model may be generated based on the feature information of the subject and the scan protocol of the subject. Therefore, the shape of the reference subject model may be matched with the body shape of the subject, which may further improve the accuracy of subject positioning of the subject.

Figure 9:
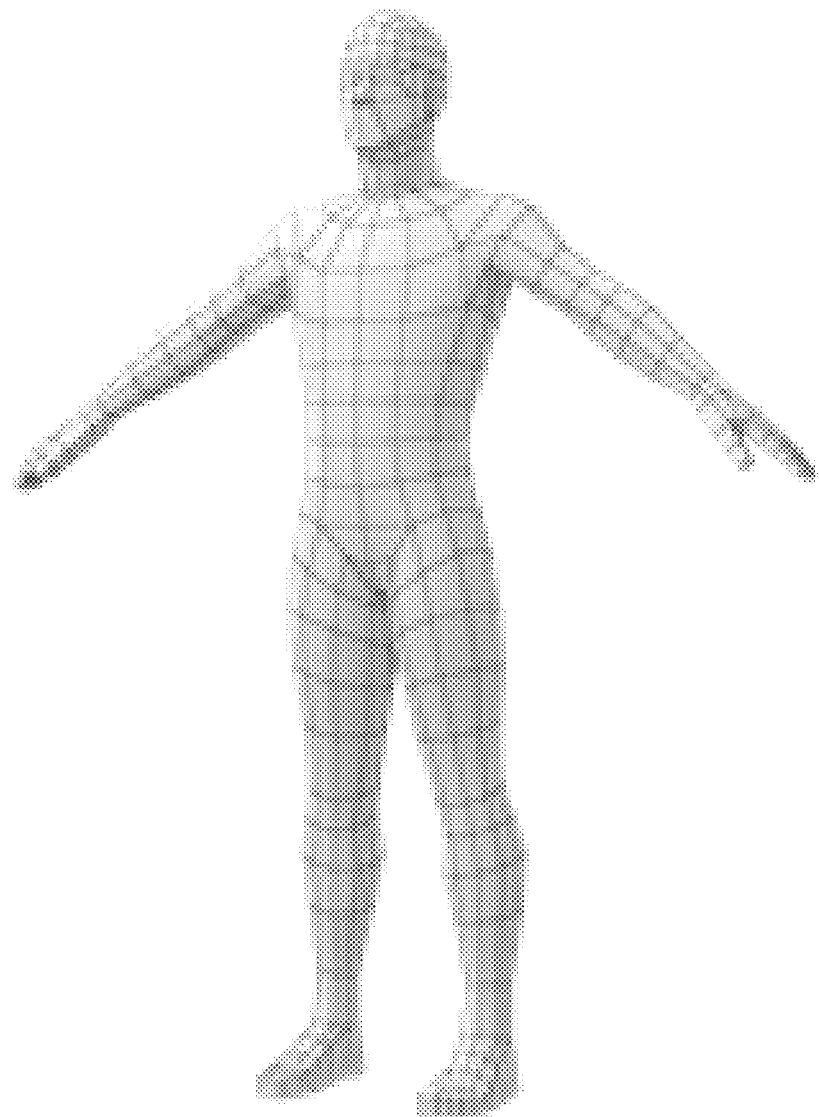
FIG. 9 is a schematic diagram illustrating an exemplary target subject model according to some embodiments of the present disclosure.

In 520, the processing device 120 (e.g., the target subject model generation module 420) may generate a target subject model (e.g., a target subject model 900 illustrated in FIG. 9) by performing one or more rendering operations on the reference subject model based on at least one rendering parameter associated with an image capturing device.

As used herein, a rendering operation refers to a process of generating a photorealistic or non-photorealistic image from a 2D or 3D model. For example, the rendering operation may be a process of displaying data associated with the reference subject model on a visualized user interface. In some embodiments, after the one or more rendering operations are performed on the reference subject model, textures, lights, shadings, shadows, reflections, transparency, and/or relative position to other objects may be added on the reference subject model, to generate the target subject model. As used herein, a target subject model refers to a model representing a subject to be scanned holding a reference posture with a model rendering effect.

In some embodiments, the processing device 120 may generate the target subject model by performing the one or more rendering operations on the reference subject model based on the at least one rendering parameter associated with the image capturing device. The image capturing device may include any type of device that is capable of acquiring image data, such as a 3D camera, an RGB sensor, an RGB-D sensor, a 3D scanner, a 3D laser imaging device, a structured light scanner, as described in FIG. 1. In some embodiments, the at least one rendering parameter may include an intrinsic parameter of the image capturing device, an extrinsic parameter of the image capturing device, or the like, or any combination thereof. The intrinsic parameters of the image capturing device may represent the optical, geometric, and digital characteristics of the image capturing device. For example, the intrinsic parameters of the image capturing device may include a focal length, an optical center, etc. The extrinsic parameters of the image capturing device may represent the relative location and orientation of the image capturing device with respect to a medical coordinate system (also referred to as a first coordinate system associated with a medical device) (e.g., the medical coordinate system 160 illustrated in FIG. 1). For example, the extrinsic parameters of the image capturing device may include a tilt angle of the image capturing device, a yaw angle of the image capturing device, a height of the image capturing device above a plane of the scene captured by the image capturing device, etc. In some embodiments, the intrinsic parameters and the extrinsic parameters of the image capturing device may be determined and/or corrected according to process 800 as described in FIG. 8.

In some embodiments, the processing device 120 may perform the one or more rendering operations on the reference subject model based on the at least one rendering parameter associated with the image capturing device. For example, the processing device 120 may adjust a display effect (e.g., a display angle, a display position, a display size) of the reference subject model on a display of a terminal device (e.g., the terminal device 130) based on the intrinsic parameter of the image capturing device and/or the extrinsic parameter of the image capturing device, to generate the target subject model. For illustration purposes, under ideal circumstances, when the subject holds the reference posture and in the scan position, image data of the subject and the target subject model can substantially overlap.

In some embodiments, the processing device 120 may perform the one or more rendering operations on the reference subject model according to one or more rendering algorithms. Exemplary rendering algorithms may include a scanline rendering algorithm, a ray tracing algorithm, a luminous energy radiosity algorithm, a physically based rendering technique, a light field rendering technique, or the like, or any combination thereof. In some embodiments, the processing device 120 may perform the one or more rendering operations on the reference subject model using a model rendering tool (e.g., a 3D studio max).

In 530, the processing device 120 (e.g., the positioning result generation module 430) may generate a positioning result by integrating the target subject model with image data related to a scan scene of the subject captured by the image capturing device.

The image data related to the scan scene of the subject may include a 2D image, a 3D image, a 4D image (e.g., a time series of 3D images), or the like. In some embodiments, the image data related to the scan scene of the subject may be captured by the image capturing device mounted in an examination room. In some embodiments, the acquisition of the image data by the image capturing device, the transmission of the captured image data to the processing device 120, and the analysis of the image data may be performed substantially in real-time so that the image data may provide information indicating a substantially real-time status of the scan scene (e.g., a substantially real-time position and/or posture of the subject).

In some embodiments, the image data related to the scan scene may include image data of the subject. For example, the image data may be a real-time video of the subject. In some embodiments, the processing device 120 may obtain the image data of the subject captured by the image capturing device. The processing device 120 may generate composite image data illustrating the target subject model and the subject based on the target subject model and the image data of the subject. The composite image data may include a 2D image, a 3D image, a 4D image, or the like. In some embodiments, in the composite image data, a representation of the target subject model may be superimposed on a representation of the subject. For example, the image data of the subject may be an image (e.g., a color image, an infrared image) of the subject. The composite image data may be generated by superimposing the representation of the target subject model on the representation of the subject in the image of the subject.

In some embodiments, the processing device 120 may generate the composite image data according to one or more video fusion algorithms. In some embodiments, the processing device 120 may generate the composite image data by placing the representation of target subject model in a second coordinate system associated with an image capturing device (also referred to as a camera coordinate system). As used herein, a second coordinate system associated with an image capturing device refers to a coordinate system that uses the camera center as its origin and the optic axis as the Z-axis. The X-axis and Y-axis of the second coordinate system may define an image plane. For example, the processing device 120 may place the representation of target subject model in the second coordinate system based on the intrinsic parameters and the extrinsic parameters of the image capturing device.

In some embodiments, the representation of the target subject model in the composite image data may be transparent or semi-transparent. Accordingly, in the composite image data, the positional relationship between the target subject model and the subject may be easily identified based on the representation of the target subject model and the representation of the subject in the composite image data.

In some embodiments, the processing device 120 may generate a current subject model based on the image data of the subject. The processing device 120 may generate the composite image data illustrating the target subject model and the current subject model based on the target subject model and the current subject model. For example, in the composite image data, a representation of the target subject model may be superimposed on a representation of the current subject model. In some embodiments, the representation of the target subject model or the representation of the current subject model in the composite image data may be transparent or semi-transparent. Accordingly, in the composite image data, the positional relationship between the target subject model and the current subject model may be easily identified based on the representation of the target subject model and the representation of the current subject model in the composite image data. More descriptions for generating the current subject model may be found elsewhere in the present disclosure (e.g., FIG. 6, and descriptions thereof).

In 540, the processing device 120 (e.g., the adjustment module 440) may position the subject based on the positioning result.

In some embodiments, the processing device 120 may cause a terminal device (e.g., the terminal device 140) to display the positioning result (e.g., the composite image data illustrating the target subject model and the subject, the composite image data illustrating the target subject model and the current subject model), so as to guide a user (e.g., a doctor, a nurse, a technician, an operator of the medical device) and/or the subject to adjust the subject's posture.

In some embodiments, the processing device 120 may cause a first terminal device of the user to display the positioning result. The user may determine whether a current posture of the subject needs to be adjusted based on the positioning result. In response to determining that the current posture of the subject needs to be adjusted, the user may instruct the subject to move one or more body parts of the subject to hold the reference posture based on the positioning result.

In some embodiments, the processing device 120 may cause a second terminal device of the subject to display the positioning result. The second terminal device may include a display device in the vicinity of the subject, e.g., mounted on the medical device or the ceiling of the examination room. The subject may view the positioning result via the second terminal device and get information regarding the current posture he/she holds and the reference posture that he/she needs to hold. The subject may adjust his/her current posture based on the positioning result.

In some embodiments, the processing device 120 may cause the first terminal device of the user and the second terminal device of the subject to both display the positioning result. The subject may view the positioning result via the second terminal device and adjust his/her current posture based on the positioning result, and the user may view the positioning result via the first terminal device and instruct the subject to hold the reference posture based on the positioning result.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the image data related to the scan scene may include image data of the examination room where the medical device (e.g., the medical device 110) is located. In some embodiments, the processing device 120 may generate composite image data illustrating the target subject model and the examination room based on the target subject model and the image data of the examination room. For example, the processing device 120 may generate composite image data illustrating the target subject model and the medical device based on the target subject model and the image data of the examination room. In some embodiments, in the composite image data, a representation of the target subject model may be in a suitable position in the examination room, which may be used to guide the subject to be located at a scan position (i.e., a specific position for receiving the scan) in the examination room, and hold the reference posture. For example, if the chest of the subject needs to be imaged by an X-ray imaging device, in the composite image data, the representation of the target subject model may be located in front of a representation of the X-ray imaging device. As another example, if the vertebral of the subject needs to be imaged by a CT device, in the composite image data, the representation of the target subject model may be located above a representation of a scanning table of the CT device. In some embodiments, the processing device 120 may cause the first terminal device of the user and/or the second terminal device of the subject to display the positioning result (e.g., the composite image data illustrating the target subject model and the examination room). The subject may view the positioning result via the second terminal device, and the user may view the positioning result via the first terminal device and guide the subject to the scan position in the examination room and hold the reference posture.

Figure 6:
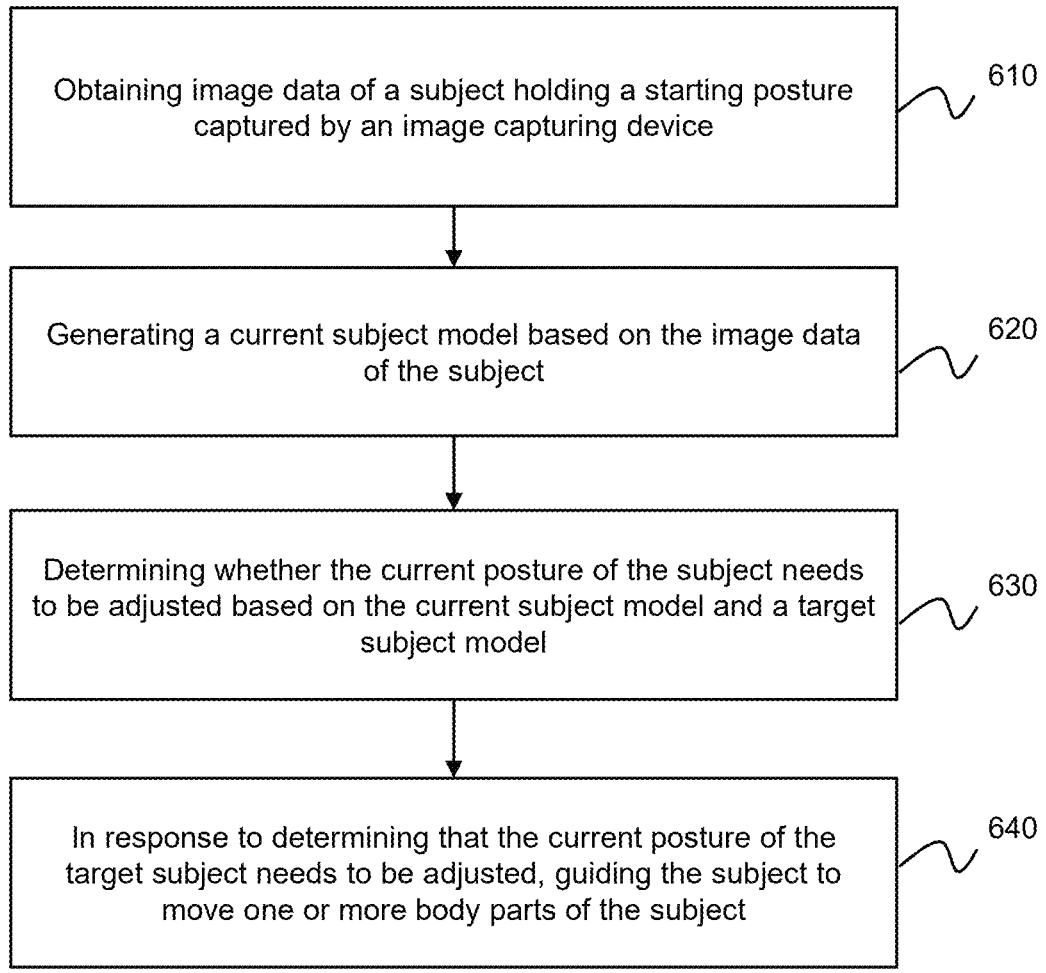
FIG. 6 is a flowchart illustrating an exemplary process for subject positioning according to some embodiments of the present disclosure.

FIG. 6 is a flowchart illustrating an exemplary process for subject positioning according to some embodiments of the present disclosure. In some embodiments, process 600 may be executed by the medical system 100. For example, the process 600 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, operation 540 in FIG. 5 may be performed according to process 600.

In 610, the processing device 120 (e.g., the adjustment module 440) may obtain target image data of a subject holding a current posture captured by an image capturing device.

The target image data may include a 2D image, a 3D image, a 4D image, and/or any related image data of the subject. The target image data may include color image data, point-cloud data, depth image data, mesh data, or the like, or any combination thereof, of the subject. In some embodiments, the target image data of the subject may be captured by an image capturing device mounted in an examination room. The image capturing device may include any type of device that is capable of acquiring image data, such as a 3D camera, an RGB sensor, an RGB-D sensor, a 3D scanner, a 3D laser imaging device, a structured light scanner, as described in FIG. 1.

The current posture of the subject may reflect one or more of a position, a pose, a shape, a size, etc., of the subject (or a portion thereof) when the target image data is captured. In some embodiments, the target image data may be captured by the image capturing device after the subject is positioned at a scan position for receiving a scan by the medical device (e.g., the medical device 110). In some embodiments, the processing device 120 may transmit an instruction to the image capturing device to capture image data of the subject after the subject is positioned at the scan position. In response to the instruction, the image capturing device may capture image data of the subject as the target image data and transmit the captured target image data to the processing device 120 directly or via a network (e.g., the network 150). As another example, the image capturing device may be directed to capture the target image data of the subject continuously or intermittently (e.g., periodically) after the subject is positioned at the scan position. In some embodiments, after the image capturing device captures image data, the image capturing device may transmit the image data to the processing device 120 as the target image data for further analysis. In some embodiments, the acquisition of the target image data by the image capturing device, the transmission of the captured target image data to the processing device 120, and the analysis of the target image data may be performed substantially in real-time so that the target image data may provide information indicating a substantially real-time status (e.g., a substantially real-time position, a substantially real-time posture) of the subject. Accordingly, a current subject model generated based on the target image data of the subject may also provide information indicating a substantially real-time status of the subject.

In 620, the processing device 120 (e.g., the adjustment module 440) may generate a current subject model based on the target image data of the subject.

As used herein, a current subject model of a subject determined based on target image data of the subject refers to a model representing the subject holding a posture (e.g., the current posture) when the target image data is captured. In some embodiments, the current subject model may include a 2D skeleton model, a 3D skeleton model, a 3D mesh model, or the like, of the subject. In some embodiment, the processing device 120 may generate the current subject model (e.g., a 3D mesh model) of the subject based on the target image data according to one or more mesh generation techniques as described in FIG. 5.

In 630, the processing device 120 (e.g., the adjustment module 440) may determine whether the current posture of the subject needs to be adjusted based on the current subject model and a target subject model.

In some embodiments, the processing device 120 may determine a matching degree between the current subject model and the target subject model. A relatively high matching degree between the current subject model and the target subject model may correspond to a relatively small difference between the current subject model and the target subject model.

The matching degree between the current subject model and the target subject model may be determined in various approaches. In some embodiments, the processing device 120 may identify a first contour of the current subject model, and identify a second contour of the target subject model. A contour of a model (e.g., the current subject model, the target subject model) may be formed by an edge of the surface of the model. The processing device 120 may further determine the matching degree between the current subject model and the target subject model based on a matching degree between the first contour of the current subject model and the second contour of the target subject model.

In some embodiments, the processing device 120 may generate composite image data illustrating the current subject model and the target subject model. In the composite image data, a representation of the current subject model may be superimposed on a representation of the target subject model. The processing device 120 may determine the matching degree between the current subject model and the target subject model based on the composite image data. For example, the processing device 120 may determine, in the composite image data, a proportion of the representation of the current subject model that is overlapped with the representation of the target subject model. The higher the proportion is, the higher the matching degree between the current subject model and the target subject model.

In some embodiments, the processing device 120 may identify one or more first feature points from the current subject model, and identify one or more second feature points from the target subject model. Each of the one or more first feature points may correspond to one of the one or more second feature points. The processing device 120 may further determine the matching degree between the current subject model and the target subject model based on the one or more first feature points and the one or more second feature points. More descriptions for determining the matching degree between the current subject model and the target subject model based on the one or more first feature points and the one or more second feature points may be found elsewhere in the present disclosure (e.g., FIG. 7 and descriptions thereof)

Further, the processing device 120 may determine whether the current posture of the subject needs to be adjusted based on the matching degree. For example, the processing device 120 may compare the matching degree with a threshold degree. The threshold degree may be manually set by a user of the medical system 100, or be determined by one or more components (e.g., the processing device 120) of the medical system 100 according to different situations. For example, the threshold degree may be 70%, 75%, 80%, 85%, or the like.

In 640, in response to determining that the current posture of the subject needs to be adjusted, the processing device 120 (e.g., the adjustment module 440) may guide the subject to move one or more body parts of the subject.

In some embodiments, in response to determining that the matching degree is less than the threshold degree, the processing device 120 may determine that the current posture of the subject needs to be adjusted. For example, the processing device 120 may generate a reminder. The reminder may be in the form of text, voice, a picture, a video, a haptic alert, or the like, or any combination thereof. In some embodiments, the reminder may include information regarding an error in the current posture of the subject. The error may indicate that which portion(s) of the current posture does not match the reference posture. In some embodiments, the processing device 120 may transfer the reminder to a first terminal device associated with a user (e.g., an operator) and/or a second terminal device associated with the subject (e.g., a patient). For example, the first terminal device and/or the second terminal device may display an image of a portion of the current posture of the subject that does not match the reference posture. As another example, the first terminal device and/or the second terminal device may display text describing the portion of the current posture of the subject that does not match the reference posture. As still another example, the reminder may be provided to the subject in the form of a voice instruction, such as "please move to your left," "please put your arms on your waist," or the like. The user may guide the subject to move one or more body parts of the subject based on the reminder.

In some embodiments, operations 610 to 640 may be repeated until the matching degree between the current subject model and the target subject model is greater than (or equal to) the threshold degree. For example, the current subject model may be updated based on new target image data of the subject captured after the posture of the subject is adjusted. The processing device 120 may determine whether the adjusted posture of the subject needs to be further adjusted based on the updated current subject model and the target subject model.

In some embodiments, in response to determining that the matching degree is greater than (or equal to) the threshold degree, the processing device 120 may determine that the current posture of the subject does not need to be adjusted. For example, the processing device 120 may generate instructions to operate the medical device 110 to scan the subject.

In some embodiments, the processing device 120 may monitor the posture of the subject during the scan of the subject. For example, during the scan of the subject, the processing device 120 may obtain image data of the subject continuously or intermittently (e.g., periodically). The processing device 120 may determine whether the posture of the subject needs to be adjusted during the scan of the subject based on the target subject model and the image data of the subject (or a model generated based on the image data of the subject). In response to determining that the posture of the subject needs to be adjusted during the scan of the subject, the processing device 120 may generate a reminder to the subject and/or the user of the medical device. In some embodiments, in response to determining that the posture of the subject needs to be adjusted during the scan of the subject, the processing device 120 may cause the medical device to terminate or pause the scan. Thus, the quality of the scan, e.g., assessed based on the quality of an image generated based on the scan, may be improved and the operation time may be saved.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 620 may be omitted. The processing device 120 may determine whether the current posture of the subject needs to be adjusted based on the target image data and the target subject model.

Figure 7:
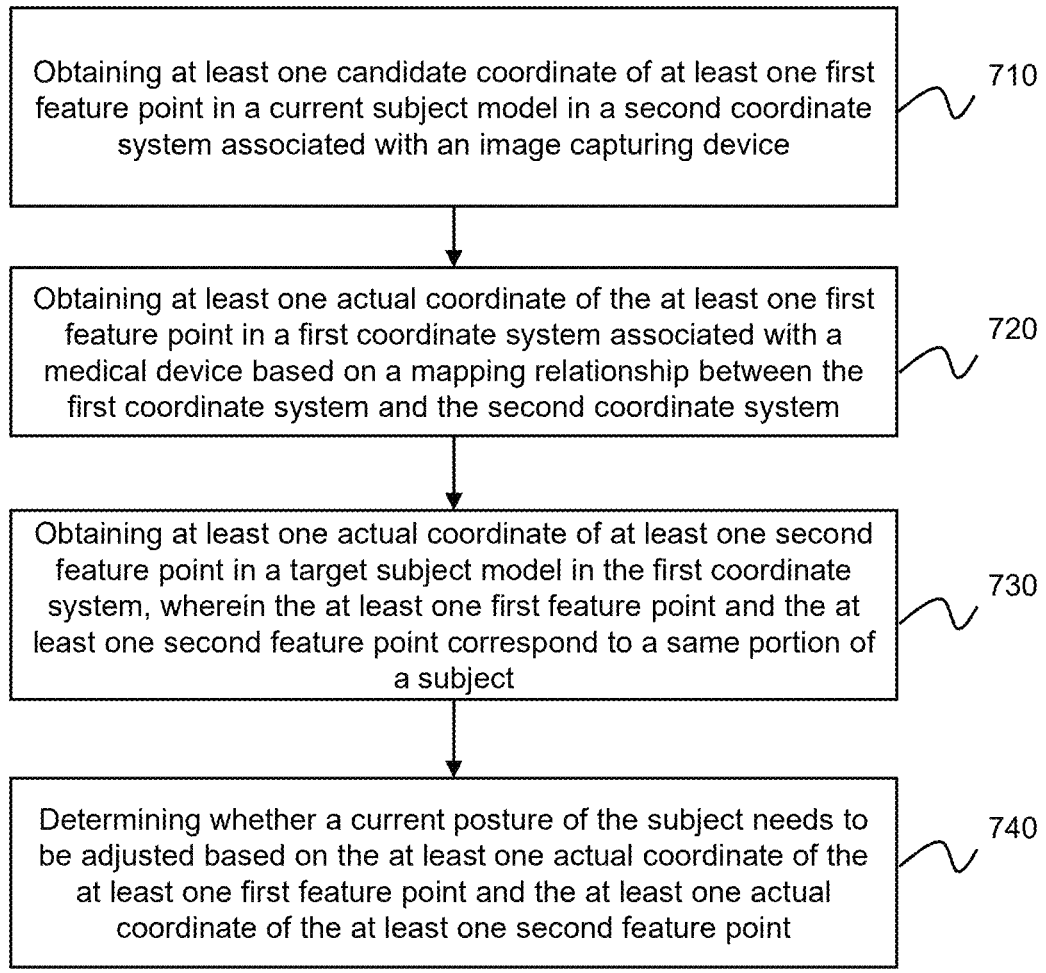
FIG. 7 is a flowchart illustrating an exemplary process for subject positioning according to some embodiments of the present disclosure.

FIG. 7 is a flowchart illustrating an exemplary process for subject positioning according to some embodiments of the present disclosure. In some embodiments, process 700 may be executed by the medical system 100. For example, the process 700 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, operation 630 in FIG. 6 may be performed according to process 700.

In 710, the processing device 120 (e.g., the adjustment module 440) may obtain at least one candidate coordinate of at least one first feature point in a current subject model in a second coordinate system associated with an image capturing device.

As used herein, a second coordinate system associated with an image capturing device (also referred to as a camera coordinate system) refers to a coordinate system that uses the camera center as its origin and the optic axis as the Z-axis. The X-axis and Y-axis of the second coordinate system may define an image plane.

In some embodiments, a feature point (e.g., the first feature point, a second feature point) may correspond to a specific physical point of the subject, such as an anatomical joint (e.g., a shoulder joint, a knee joint, an elbow joint, an ankle joint, a wrist joint) or another representative physical point in a body region (e.g., the head, the neck, a hand, a leg, a foot, a spine, a pelvis, a hip) of the subject.

In some embodiments, a number (or count) and/or a position of the identified first feature point may be determined based on a scan protocol of the subject (e.g., a portion of the subject to be scanned). For example, if the portion of the subject to be scanned is the left arm, the first feature points may include joints of the left arm, such as finger joints on the left hand, a left wrist joint, and a left elbow joint. As another example, if the portion of the subject to be scanned is the whole body, the first feature point may include joints of the whole body, such as a shoulder joint, a knee joint, an elbow joint, an ankle joint, and a wrist joint.

In some embodiments, the at least one first feature point may be identified in the current subject model manually by a user (e.g., a doctor, a nurse, a technician) on an interface (e.g., implemented on a terminal device 140) that displays the current subject model. Alternatively, the at least one first feature point may be generated by a computing device (e.g., the processing device 120) automatically according to an image analysis algorithm (e.g., an image segmentation algorithm, a feature point extraction algorithm). For example, the at least one first feature point may be generated by a computing device (e.g., the processing device 120) automatically according to a Kinect skeleton tracking technology. Alternatively, the at least one first feature point may be generated by the computing device semi-automatically based on an image analysis algorithm in combination with information provided by a user. Exemplary information provided by the user may include a parameter relating to the image analysis algorithm, a position parameter relating to a first feature point, an adjustment to, or rejection or confirmation of a preliminary first feature point generated by the computing device, etc.

Further, the processing device 120 may obtain at least one candidate coordinate of at least one first feature point in the current subject model in the second coordinate system associated with the image capturing device. In some embodiments, for each first feature point, the processing device 120 may obtain an image coordinate of the first feature point in target image data (e.g., the target image data that used to generate the current subject model as described in FIG. 6) in an image coordinate system. As used herein, an image coordinate system refers to a coordinate system that describes positions of an object in an image captured by an image capturing device. The processing device 120 may obtain a candidate coordinate of the first feature point in the second coordinate system associated with the image capturing device based on a mapping relationship between the image coordinate system and the second coordinate system associated with the image capturing device. The mapping relationship between the image coordinate system and the second coordinate system may represent a position relationship between the image coordinate system and the second coordinate system. In some embodiments, the mapping relationship between the image coordinate system and the second coordinate system associated with the image capturing device may be determined based on parameters (e.g., intrinsic parameters) of the image capturing device. For example, the intrinsic parameters of the image capturing device may form an intrinsic matrix. The intrinsic matrix may be used to perform a transformation between a camera coordinate denoted by the second coordinate system associated with the image capturing device and an image coordinate denoted by the image coordinate system.

In some embodiments, the mapping relationship between the image coordinate system and the second coordinate system may be determined by one or more components (e.g., the processing device 120) of the medical system 100, or a user of the medical system 100, and stored in a storage device of the medical system 100. The processing device 120 may access the storage device and retrieve the mapping relationship between the image coordinate system and the second coordinate system.

In 720, the processing device 120 (e.g., the adjustment module 440) may obtain at least one actual coordinate of the at least one first feature point in a first coordinate system associated with a medical device based on a mapping relationship between the first coordinate system and the second coordinate system.

The mapping relationship between the first coordinate system and the second coordinate system may represent a position relationship between first coordinate system and the second coordinate system. The mapping relationship between the first coordinate system and the second coordinate system may be used to perform a transformation between a first coordinate denoted by the first coordinate system and a second coordinate denoted by the second coordinate system. More description for determining the mapping relationship between the first coordinate system and the second coordinate system may be found elsewhere in the present disclosure (e.g., FIG. 8, and descriptions thereof).

In 730, the processing device 120 (e.g., the adjustment module 440) may obtain at least one actual coordinate of at least one second feature point in a target subject model in the first coordinate system.

In some embodiments, the at least one first feature point and the at least one second feature point may correspond to a same portion of a subject. For example, the at least one first feature point and the at least one second feature point may correspond to a same anatomical joint of the subject.

In some embodiments, the at least one second feature point may be identified in the target subject model manually by a user (e.g., a doctor, a nurse, a technician) on an interface (e.g., implemented on a terminal device 140) that displays the current subject model. Alternatively, the at least one second feature point may be generated by a computing device (e.g., the processing device 120) automatically according to an image analysis algorithm (e.g., an image segmentation algorithm, a feature point extraction algorithm). For example, the at least one second feature point may be generated by a computing device (e.g., the processing device 120) automatically according to a Kinect skeleton tracking technology. Alternatively, the at least one second feature point may be generated by the computing device semi-automatically based on an image analysis algorithm in combination with information provided by a user. Further, the processing device 120 may obtain the at least one actual coordinate of the at least one second feature point in the target subject model in the first coordinate system.

In 740, the processing device 120 (e.g., the adjustment module 440) may determine whether a current posture of the subject needs to be adjusted based on the at least one actual coordinate of the at least one first feature point and the at least one actual coordinate of the at least one second feature point.

In some embodiments, the processing device 120 may determine a deviation between the at least one actual coordinate of the at least one first feature point and the at least one actual coordinate of the at least one second feature point. The processing device 120 may determine whether the current posture of the subject needs to be adjusted based on the deviation. In some embodiments, the processing device 120 may determine a distance between the at least one actual coordinate of the at least one first feature point and the at least one actual coordinate of the at least one second feature point. The processing device 120 may determine whether the current posture of the subject needs to be adjusted based on the distance and a distance threshold. In some embodiments, the distance threshold may have a default value or a value manually set by a user. Additionally or alternatively, the distance threshold may be adjusted according to an actual need. For example, the distance threshold may be 1 cm, 3 cm, 5 cm, or the like. In some embodiments, the distance thresholds corresponding to different physical points may be the same. In some embodiments, the distance thresholds corresponding to different physical points may be different. As used herein, "a distance threshold corresponding to a specific physical point" refers to a distance threshold corresponding to a distance between an actual coordinate of a first feature point corresponding to the specific physical point and an actual coordinate of a second feature point corresponding to the specific physical point.

In some embodiments, in response to determining that a distance between an actual coordinate of a first feature point and an actual coordinate of a second feature point is greater the distance threshold, the processing device 120 may determine that the current posture of the subject needs to be adjusted. In some embodiments, whether the current posture of the subject needs to be adjusted is determined based on multiple distances between multiple actual coordinates of multiple first feature points and multiple actual coordinates of multiple second feature points. If each of the multiple distances exceeds the distance threshold, the processing device 120 may determine that the current posture of the subject needs to be adjusted.

In some embodiments, the processing device 120 may determine at least one target physical point of the subject based on the scan protocol of the subject. The at least one target physical point may be in the portion of the subject to be scanned and may have a great influence on a scan result (e.g., the quality of a reconstructed image). For example, if the portion of the subject to be scanned is the right leg, the target physical point may be determined as the right knee. In some embodiments, in response to determining that a distance between an actual coordinate of a first feature point corresponding to the target physical point of the subject and an actual coordinate of a second feature point corresponding to the target physical point of the subject is greater the distance threshold, the processing device 120 may determine that the current posture of the subject needs to be adjusted. In response to determining that a distance between an actual coordinate of a first feature point corresponding to another physical point of the subject (i.e., a physical point other than the target physical point) and an actual coordinate of a corresponding second feature point is greater the distance threshold, the processing device 120 may determine that the current posture of the subject does not need to be adjusted. In some embodiments, the distance threshold corresponding to the target physical point may be set relatively small, and the distance threshold corresponding to a physical point other than the target physical point may be set relatively large. In some embodiments, in response to determining that the current posture of the subject needs to be adjusted, the processing device 120 may generate a reminder, as described in connection with operation 640.

In some embodiments, the processing device 120 may determine a matching degree between the current subject model and the target subject model based on the at least one actual coordinate of the at least one first feature point and the at least one actual coordinate of the at least one second feature point. For example, the processing device 120 may determine the matching degree between the current subject model and the target subject model based on a proportion of actual coordinates of first feature points in the current subject model that are matched with actual coordinates of corresponding second feature points in the target subject model. For example, if 70% of actual coordinates of the first feature points in the current subject model is matched with actual coordinates of corresponding second feature points in the target subject model, the processing device 120 may determine that the matching degree between the current subject model and the target subject model is 70%. The processing device 120 may further determine whether a current posture of the subject needs to be adjusted based on the matching degree between the current subject model and the target subject model, as described in connection with operations 630 and 640.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 120 may determine whether the current posture of the subject needs to be adjusted based on a proportion of actual coordinates of first feature points in the current subject model that are matched with actual coordinates of corresponding second feature points in the target subject model. For example, the processing device 120 may determine whether the current posture of the subject needs to be adjusted based on the proportion of actual coordinates of first feature points in the current subject model that are matched with actual coordinates of corresponding second feature points in the target subject model, and a proportion threshold (e.g., 60%, 70%, 80%, 90%, 95%). In response to determining that the proportion of actual coordinates of first feature points in the current subject model that are matched with actual coordinates of corresponding second feature points in the target subject model is less than the proportion threshold, the processing device 120 may determine that the current posture of the subject needs to be adjusted. The processing device 120 may generate a reminder including information regarding the first feature point(s) in the current subject model that does not match the corresponding second feature point(s) in the target subject model.

Figure 8:
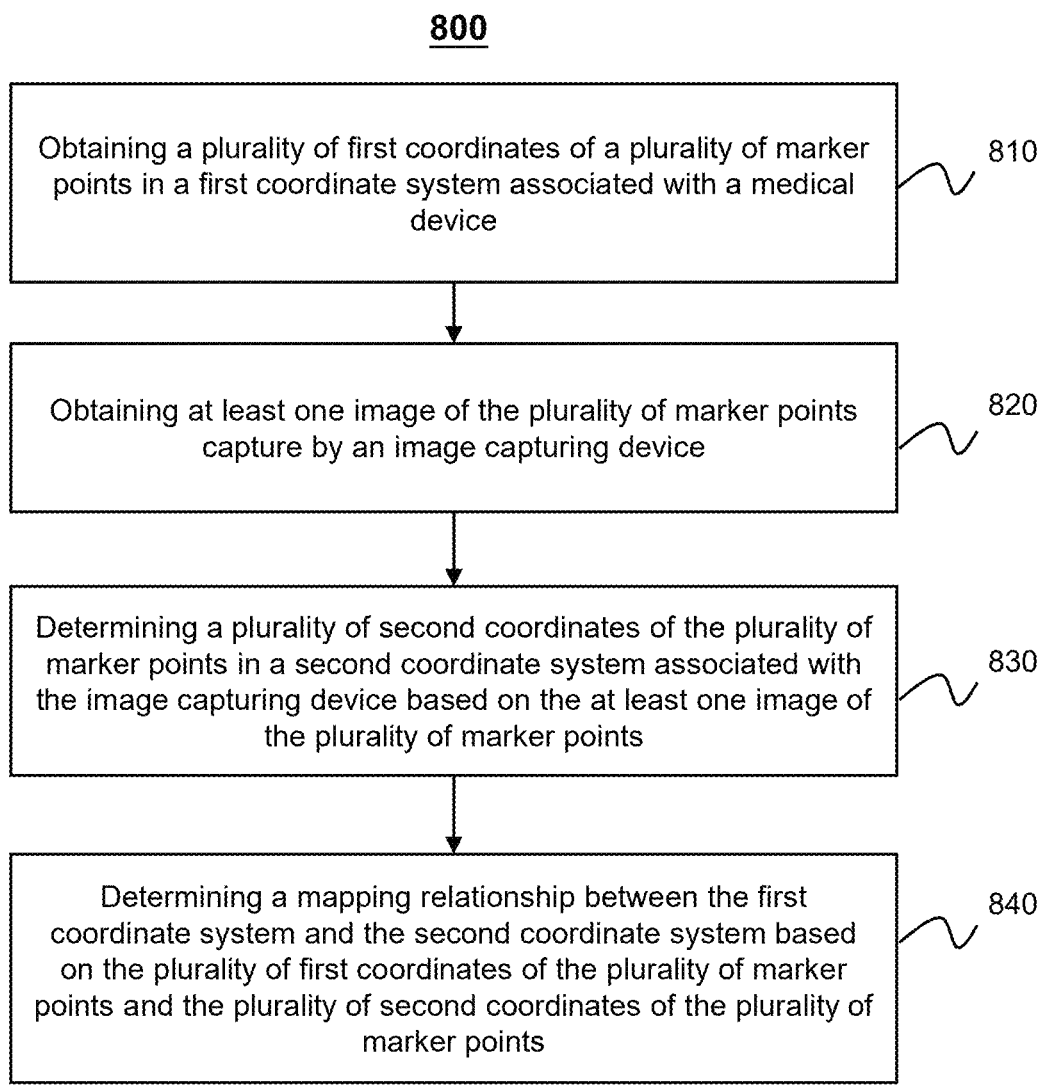
FIG. 8 is a flowchart illustrating an exemplary process for determining a mapping relationship between a first coordinate system associated with a medical device and a second coordinate system associated with an image capturing device according to some embodiments of the present disclosure.

FIG. 8 is a flowchart illustrating an exemplary process for determining a mapping relationship between a first coordinate system associated with a medical device and a second coordinate system associated with an image capturing device according to some embodiments of the present disclosure. In some embodiments, process 800 may be executed by the medical system 100. For example, the process 800 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, the processing device 120 (e.g., the adjustment module 440) may obtain a plurality of first coordinates of a plurality of marker points in a first coordinate system associated with a medical device.

The marker point may be disposed at a suitable position in the medical system 100 that can be captured by an image capturing device. That is, the marker point may be disposed in a field of view of the image capturing device. For example, the marker point may be disposed on a surface of a scanning table of a medical device (e.g., the medical device 110). As another example, the marker point may be disposed on a gantry of the medical device (e.g., the medical device 110).

In some embodiments, the plurality of first coordinates of the plurality of marker points in the first coordinate system may be determined by one or more components of the medical system 100, or manually set by a user of the medical system 100 according to different situations. For example, the user may input the plurality of first coordinates of the plurality of marker points in the first coordinate system.

In 820, the processing device 120 (e.g., the adjustment module 440) may obtain at least one image of the plurality of marker points capture by an image capturing device.

In some embodiments, the image capturing device may capture one or more images of the plurality of marker points. For example, the image capturing device may capture an image including all the marker points. As another example, the image capturing device may capture a plurality of images, and each image may include a portion of the plurality of marker points.

In 830, the processing device 120 (e.g., the adjustment module 440) may determine a plurality of second coordinates of the plurality of marker points in a second coordinate system associated with the image capturing device based on the at least one image of the plurality of marker points.

In some embodiments, for each marker point, the processing device 120 may identify a representation of the marker point in the at least one image. The processing device 120 may determine a position of the marker point in the second coordinate system based on a position of the representation of the marker point in the at least one image. For example, for each marker point, the processing device 120 may determine an image coordinate of the marker point in an image coordinate system based on the position of the representation of the marker point in the at least one image. The processing device 120 may determine the second coordinate of the marker point in the second coordinate system associated with the image capturing device based on a mapping relationship between the image coordinate system and the second coordinate system (e.g., an intrinsic matrix determined based on intrinsic parameters of the image capturing device).

In 840, the processing device 120 (e.g., the adjustment module 440) may determine a mapping relationship between the first coordinate system and the second coordinate system based on the plurality of first coordinates of the plurality of marker points and the plurality of second coordinates of the plurality of marker points.

In some embodiments, the processing device 120 may determine the mapping relationship between the first coordinate system and the second coordinate system (i.e., the extrinsic parameters and the intrinsic parameters of the image capturing device) based on the plurality of first coordinates of the plurality of marker points and the plurality of second coordinates of the plurality of marker points according to a 2D-to-3D conversion algorithm. The mapping relationship between the first coordinate system and the second coordinate system may represent a position relationship between first coordinate system and the second coordinate system. The mapping relationship between the first coordinate system and the second coordinate system may be used to perform a transformation between a first coordinate denoted by the first coordinate system and a second coordinate denoted by the second coordinate system.

In some embodiments, the mapping relationship between the first coordinate system and the second coordinate system may be determined according to Equation (1):

$$\begin{bmatrix} Xc \\ Yc \\ Zc \end{bmatrix} = R \begin{bmatrix} Xw \\ Yw \\ Zw \end{bmatrix} + T \quad (1)$$

where $$\begin{bmatrix} Xc \\ Yc \\ Zc \end{bmatrix}$$

refers to coordinates of a point in the second coordinate system associated with the image capturing device;

$$\begin{bmatrix} Xw \\ Yw \\ Zw \end{bmatrix}$$

refers to coordinates of the point in the first coordinate system associated with the medical device; R refers to a rotation matrix (e.g., a 3×3 matrix); and T refers to a translation matrix (e.g., a 3×1 matrix).

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, process 800 may be performed before operation 530. In some embodiments, the position of the image capturing device may be fixed in the subject positioning process (e.g., process 500) disclosed in the present disclosure. Process 800 may be performed at a fixed interval, such as one day, one week, one month, etc., to calibrate the parameters (e.g., the extrinsic parameters, the intrinsic parameters) of the image capturing device. In some embodiments, the position of the image capturing device may be adjustable in the subject positioning process (e.g., process 500) disclosed in the present disclosure. In this situation, process 800 may need to be performed immediately after the position of the image capturing device is changed to calibrate the parameters (e.g., the extrinsic parameters, the intrinsic parameters) of the image capturing device. Further, the target subject model may be updated based on the reference subject model according to calibrated parameters (e.g., calibrated extrinsic parameters, calibrated intrinsic parameters) of the image capturing device.

In some embodiments, the processing device 120 may obtain a first set of first coordinates of at least one marker point in the first coordinate system associated with the medical device. The at least one marker point may be configured on one or more components of the medical device (e.g., the scanning table). The processing device 120 may obtain at least one first image of the at least one marker point captured by the image capturing device. The processing device 120 may determine a first set of second coordinates of the at least one marker point in the second coordinate system associated with the image capturing device based on the at least one first image of the at least one marker point. The position of the medical device may then be changed, and the position of the at least one marker point may also be changed. For example, when the scanning table rotates or moves, the position of the at least one marker point mounted on the scanning table changes. After the position of the at least one marker point changes, the processing device 120 may obtain a second set of first coordinates of the at least one marker point in the first coordinate system associated with the medical device. The processing device 120 may obtain at least one second image of the at least one marker point captured by the image capturing device. The processing device 120 may determine a second set of second coordinates of the at least one marker point in the second coordinate system associated with the image capturing device based on the at least one second image of the at least one marker point. In some embodiments, the above operations may be repeated to obtain a plurality of sets of first coordinates of the at least one marker point in the first coordinate system, and a plurality of sets of second coordinates of the at least one marker point in the second coordinate system. Further, the processing device 120 may determine the mapping relationship between the first coordinate system and the second coordinate system based on the plurality of sets of first coordinates of the at least one marker point in the first coordinate system, and the plurality of sets of second coordinates of the at least one marker point in the second coordinate system (e.g., the first set of first coordinates of the at least one marker point in the first coordinate system, the second set of first coordinates of the at least one marker point in the first coordinate system, the first set of second coordinates of the at least one marker point in the second coordinate system, and the second set of second coordinates of the at least one marker point in the second coordinate system. According to some embodiments of the present disclosure, the position of the at least one marker point may be changed by changing the position of the medical device, the number (or count) of the marker points mounted on the medical device may be reduced.

Figure 10:
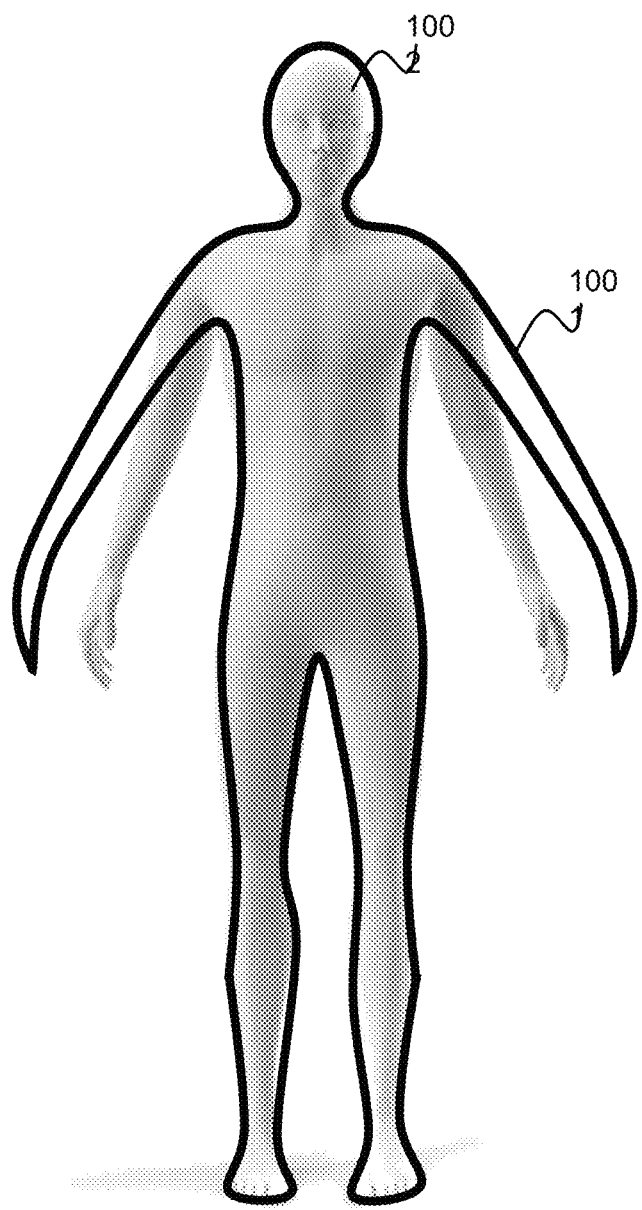
FIG. 10 is a schematic diagram illustrating exemplary composite image data illustrating a target subject model and a subject according to some embodiments of the present disclosure.
Figure 10:
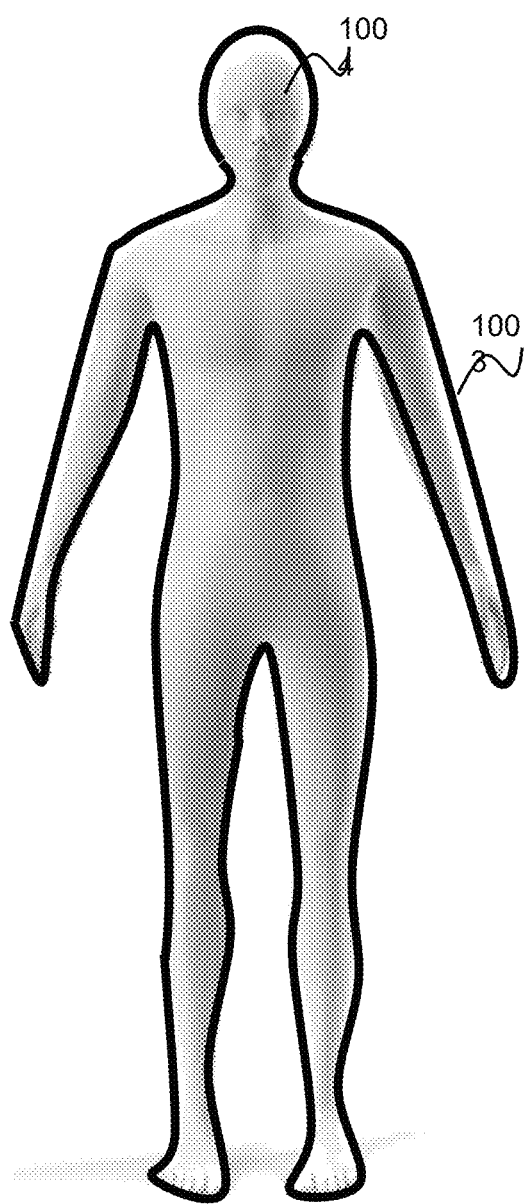

FIG. 10 is a schematic diagram illustrating exemplary composite image data illustrating a target subject model and a subject according to some embodiments of the present disclosure.

As shown in FIG. 10, composite image data 1010 may include a representation 1001 of a subject and a representation 1002 of the target subject model. The representation 1002 of the target subject model is superimposed on the representation 1001 of the subject. In some embodiments, the representation 1001 of the subject may be presented in the form of a 2D model, a 3D model (e.g., a 3D mesh model), a real image (e.g., target image data of the subject as illustrated in FIG. 6) of the subject. For illustration purposes, the representation 1001 of the subject in FIG. 10 is presented in the form of a 2D model (e.g., a current subject model as illustrated in FIG. 6). The 2D model of the subject may be generated based on target image data of the subject captured by an image capturing device after the subject is positioned at a scan position as described in FIG. 6. For example, the 2D model of the subject may illustrate a current posture (e.g., a contour) of the subject in 2D space.

In some embodiments, the processing device 120 may determine whether the current posture of the subject needs to be adjusted based on the composite image data 1010. For example, the processing device 120 may determine a matching degree between the target subject model and the current subject model based on the composted image data 1010. As another example, the processing device 120 may transmit the composite image data 1010 to a terminal device of a user for display. The user may view the composite image data 1010 and determine whether the current posture of the subject needs to be adjusted based on the composite image 1010. In some embodiments, the processing device 120 may transmit the composite image data 1010 to a terminal device of the subject to guide the subject to adjust his/her posture.

In some embodiments, in response to determining that the current posture of the subject needs to be adjusted, the processing device 120 may generate a reminder to the user and/or the subject. The user may guide the subject to move one or more body parts of the subject based on the reminder. After the current posture of the subject is adjusted, the processing device 120 may obtain second target image data of the subject, and composite image data 1020 may be generated based on the second target image data of the subject and the target subject model.

As shown in FIG. 10, the composite image data 1020 may include a representation 1003 of the subject and a representation 1004 of the target subject model. The representation 1004 of the target subject model is superimposed on the representation 1003 of the subject. For illustration purposes, the representation 1003 of the subject in FIG. 10 is presented in the form of a 2D model (e.g., a second current subject model generated based on the second target image data). In some embodiments, the processing device 120 may determine whether the adjusted posture of the subject needs to be further adjusted based on the composite image data 1020. In some embodiments, in response to determining that the posture of the subject does not need to be adjusted, the processing device 120 may generate instructions to operate a medical device (e.g., the medical device 110) to scan the subject.

It should be noted that the example illustrated in FIG. 10 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
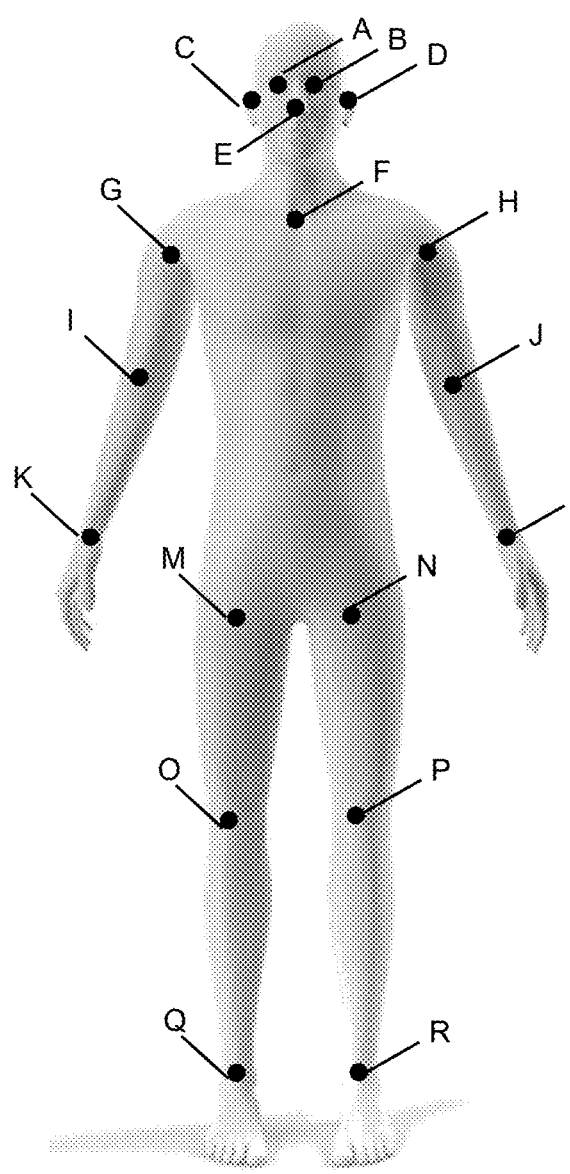
FIG. 11 is a schematic diagram illustrating an exemplary target subject model and an exemplary current subject model according to some embodiments of the present disclosure.
Figure 11:
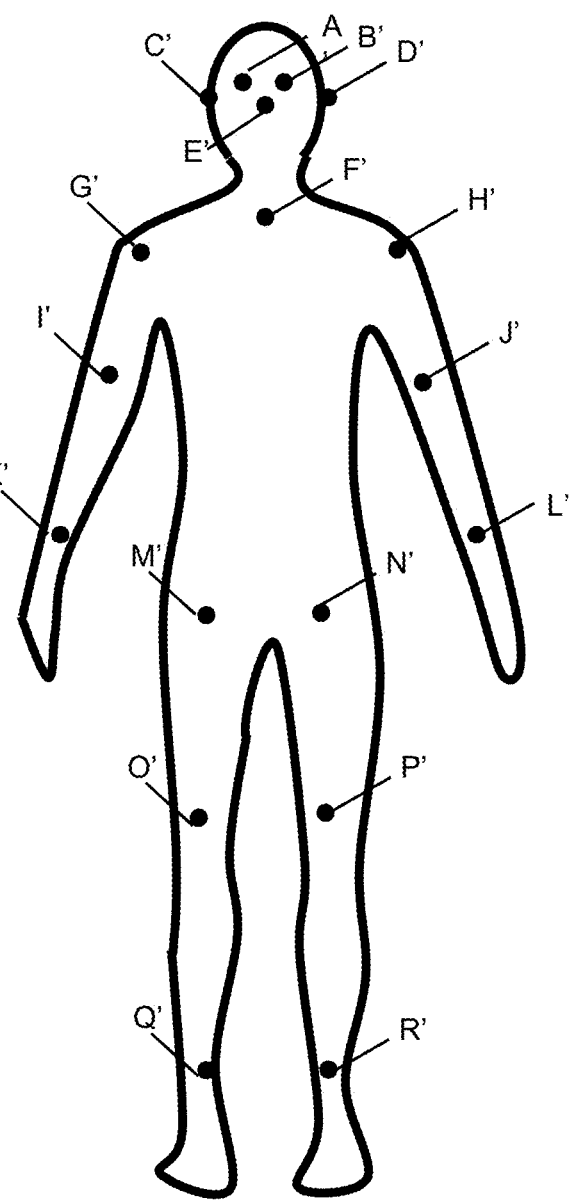

FIG. 11 is a schematic diagram illustrating an exemplary target subject model and an exemplary current subject model according to some embodiments of the present disclosure.

As illustrated in FIG. 11, a plurality of first feature points may be identified from a target subject model 1101, and a plurality of second feature points may be identified from a current subject model 1102. Each feature point (e.g., the first feature point, the second feature point) may correspond to a physical point (e.g., an anatomical joint) of the subject. For example, a first feature point A and a second feature point A' may correspond to the right eye of the subject. A first feature point B and a second feature point B' may correspond to the left eye of the subject. A first feature point C and a second feature point C' may correspond to the right ear of the subject. A first feature point D and a second feature point D' may correspond to the left ear of the subject. A first feature point E and a second feature point E' may correspond to the nose of the subject. A first feature point F and a second feature point F' may correspond to the neck of the subject. A first feature point G and a second feature point G' may correspond to the right shoulder of the subject. A first feature point H and a second feature point H' may correspond to the left shoulder of the subject. A first feature point I and a second feature point I' may correspond to the right elbow of the subject. A first feature point J and a second feature point J' may correspond to the left elbow of the subject. A first feature point K and a second feature point K' may correspond to the right wrist of the subject. A first feature point L and a second feature point L' may correspond to the left wrist of the subject. A first feature point M and a second feature point M' may correspond to the right hip of the subject. A first feature point N and a second feature point N' may correspond to the left hip of the subject. A first feature point O and a second feature point O' may correspond to the right knee of the subject. A first feature point P and a second feature point P' may correspond to the left knee of the subject. A first feature point Q and a second feature point Q' may correspond to the right ankle of the subject. A first feature point R and a second feature point R' may correspond to the left ankle of the subject.

Further, the processing device 120 may determine whether a current posture of the subject needs to be adjusted based on at least one actual coordinate of at least one first feature point in the target subject model and at least one actual coordinate of at least one second feature point in the current subject model in a first coordinate system associated with a medical device, as described in connection with FIG. 7.

It should be noted that the example illustrated in FIG. 11 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, any number count of first feature points may be identified from the target subject model 1101, and any number count of second feature points may be identified from the current subject model 1102.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for subject positioning, implemented on a computing device having one or more processors and one or more storage devices, the method comprising:
   generating a reference subject model of a subject to be scanned by a medical device based on feature information of the subject and a scan protocol of the subject, the reference subject model representing the subject holding a reference posture that the subject needs to hold during a scan to be performed;
   generating a target subject model by performing one or more rendering operations to adjust a display effect of the reference subject model based on at least one rendering parameter associated with an image capturing device, the target subject model representing the subject holding the reference posture with a model rendering effect;
   generating a positioning result by integrating the target subject model with image data related to a scan scene of the subject captured by the image capturing device, wherein the positioning result includes composite image data illustrating a positional relationship between the subject in the image data and the target subject model, and a representation of the target subject model is superimposed on a representation of the subject in the composite image data; and
   positioning the subject based on the positioning result.

2. The method of claim 1, wherein the generating a reference subject model of a subject to be scanned by a medical device based on feature information of the subject and a scan protocol of the subject comprises:
   generating a subject model of the subject based on the feature information of the subject; and
   generating the reference subject model of the subject by transforming the subject model based on the scan protocol of the subject.

3. The method of claim 1, wherein the generating a reference subject model of a subject to be scanned by a medical device based on feature information of the subject and a scan protocol of the subject comprises:
   obtaining a reference posture model based on the scan protocol of the subject; and
   generating the reference subject model of the subject by transforming the reference posture model based on the feature information of the subject.

4. The method of claim 1, wherein the at least one rendering parameter includes an intrinsic parameter of the image capturing device or an extrinsic parameter of the image capturing device, and
   the composite image data is generated by replacing the target subject model in a second coordinate system associated with the image capturing device based on the intrinsic parameter and the extrinsic parameter of the image capturing device.

5. The method of claim 1, further comprising:
obtaining a plurality of first coordinates of a plurality of marker points in a first coordinate system associated with the medical device;
obtaining at least one image of the plurality of marker points captured by the image capturing device;
determining a plurality of second coordinates of the plurality of marker points in a second coordinate system associated with the image capturing device based on the at least one image of the plurality of marker points; and
determining a mapping relationship between the first coordinate system and the second coordinate system based on the plurality of first coordinates of the plurality of marker points and the plurality of second coordinates of the plurality of marker points.

6. The method of claim 1, wherein the positioning the subject based on the positioning result comprises:
obtaining target image data of the subject holding a current posture captured by the image capturing device;
generating a current subject model based on the target image data of the subject;
determining whether the current posture of the subject needs to be adjusted based on the current subject model and the target subject model; and
in response to determining that the current posture of the target subject needs to be adjusted, guiding the subject to move one or more body parts of the subject.

7. The method of claim 6, wherein the determining whether the current posture of the subject needs to be adjusted based on the current subject model and the target subject model comprises:
obtaining at least one candidate coordinate of at least one first feature point in the current subject model in a second coordinate system associated with the image capturing device;
obtaining at least one actual coordinate of the at least one first feature point in the first coordinate system based on a mapping relationship between a first coordinate system associated with the medical device and the second coordinate system;
obtaining at least one actual coordinate of at least one second feature point in the target subject model in the first coordinate system, wherein the at least one first feature point and the at least one second feature point correspond to a same portion of the subject; and
determining whether the current posture of the subject needs to be adjusted based on the at least one actual coordinate of the at least one first feature point and the at least one actual coordinate of the at least one second feature point.

8. The method of claim 7, wherein the determining whether the current posture of the subject needs to be adjusted based on the at least one actual coordinate of the at least one first feature point and the at least one actual coordinate of the at least one second feature point comprises:
determining a deviation between the at least one actual coordinate of the at least one first feature point and the at least one actual coordinate of the at least one second feature point; and
determining whether the current posture of the subject needs to be adjusted based on the deviation.

9. The method of claim 7, wherein the at least one first feature point or the at least one second feature point corresponds to an anatomical joint of the subject.

10. A system for subject positioning, comprising:
at least one storage device storing a set of instructions; and
at least one processor in communication with the at least one storage device, when executing the stored set of instructions, the at least one processor causes the system to perform operations including:
generating a reference subject model of a subject to be scanned by a medical device based on feature information of the subject and a scan protocol of the subject, the reference subject model representing the subject holding a reference posture that the subject needs to hold during a scan to be performed;
generating a target subject model by performing one or more rendering operations to adjust a display effect of the reference subject model based on at least one rendering parameter associated with an image capturing device, the target subject model representing the subject holding the reference posture with a model rendering effect;
generating a positioning result by integrating the target subject model with image data related to a scan scene of the subject captured by the image capturing device, wherein the positioning result includes composite image data illustrating a positional relationship between the subject in the image data and the target subject model, a representation of the target subject model is superimposed on a representation of the subject in the composite image data; and
positioning the subject based on the positioning result.

11. The system of claim 10, wherein the at least one processor further causes the system to perform operations including:
obtaining a plurality of first coordinates of a plurality of marker points in a first coordinate system associated with the medical device;
obtaining at least one image of the plurality of marker points captured by the image capturing device;
determining a plurality of second coordinates of the plurality of marker points in a second coordinate system associated with the image capturing device based on the at least one image of the plurality of marker points; and
determining a mapping relationship between the first coordinate system and the second coordinate system based on the plurality of first coordinates of the plurality of marker points and the plurality of second coordinates of the plurality of marker points.

12. The system of claim 10, wherein the positioning the subject based on the positioning result comprises:
obtaining target image data of the subject holding a current posture captured by the image capturing device;
generating a current subject model based on the target image data of the subject;
determining whether the current posture of the subject needs to be adjusted based on the current subject model and the target subject model; and
in response to determining that the current posture of the target subject needs to be adjusted, guiding the subject to move one or more body parts of the subject.

13. The system of claim 12, wherein the determining whether the current posture of the subject needs to be adjusted based on the current subject model and the target subject model comprises:
obtaining at least one candidate coordinate of at least one first feature point in the current subject model in a second coordinate system associated with the image capturing device;

obtaining at least one actual coordinate of the at least one first feature point in the first coordinate system based on a mapping relationship between a first coordinate system associated with the medical device and the second coordinate system;

obtaining at least one actual coordinate of at least one second feature point in the target subject model in the first coordinate system, wherein the at least one first feature point and the at least one second feature point correspond to a same portion of the subject; and determining whether the current posture of the subject needs to be adjusted based on the at least one actual coordinate of the at least one first feature point and the at least one actual coordinate of the at least one second feature point.

14. The system of claim 13, wherein the determining whether the current posture of the subject needs to be adjusted based on the at least one actual coordinate of the at least one first feature point and the at least one actual coordinate of the at least one second feature point comprises:

determining a deviation between the at least one actual coordinate of the at least one first feature point and the at least one actual coordinate of the at least one second feature point; and determining whether the current posture of the subject needs to be adjusted based on the deviation.

15. A non-transitory computer readable medium, comprising at least one set of instructions, wherein when executed by at least one processor of a computing device, the at least one set of instructions cause the at least one processor to effectuate a method comprising:

generating a reference subject model of a subject to be scanned by a medical device based on feature information of the subject and a scan protocol of the subject, the reference subject model representing the subject holding a reference posture that the subject needs to hold during a scan to be performed;

generating a target subject model by performing one or more rendering operations to adjust a display effect of the reference subject model based on at least one rendering parameter associated with an image capturing device, the target subject model representing the subject holding the reference posture with a model rendering effect;

generating a positioning result by integrating the target subject model with image data related to a scan scene of the subject captured by the image capturing device, wherein the positioning result includes composite image data illustrating a positional relationship between the subject in the image data and the target subject model, and a representation of the target subject model is superimposed on a representation of the subject in the composite image data; and positioning the subject based on the positioning result.

16. The method of claim 1, wherein the representation of the target subject model or the representation of the subject in the composite image data is transparent or semi-transparent such that the positional relationship between the target subject model and the subject is easily identified in the composite image data.

17. The method of claim 1, wherein the image data related to the scan scene includes target image data of the subject holding a current posture captured by the image capturing device, the method further includes generating a current subject model representing the subject holding the current posture based on the target image data, and the representation of the subject in the composition image data is presented in the form of the current subject model.

18. The method of claim 17, wherein the positioning the subject based on the positioning result comprises:

determining, in the composite image data, a proportion of the representation of the current subject model that is overlapped with the representation of the target subject model;

determining a matching degree between the current subject model and the target subject model based on the proportion; and determining whether the current posture of the subject needs to be adjusted based on the matching degree.

19. The method of claim 17, wherein the image data related to the scan scene further includes image data of an examination room where the medical device is located, the composite image data is further generated the composite image data based on the image data of the examination room to illustrate the examination room, and in the composite image data, the representation of the target subject model is at a position for receiving the scan in a representation of the examination room and holds the reference posture.

20. The method of claim 1, wherein the positioning the subject based on the positioning result comprises:

causing a first terminal device of a user to display the positioning result for the user to determine whether a current posture of the subject needs to be adjusted; and causing a second terminal device of the subject to display the positioning result for the subject to adjust the current posture based on the positioning result.

* * * * *